US010489975B2

(12) United States Patent
Mendez et al.

(10) Patent No.: US 10,489,975 B2
(45) Date of Patent: Nov. 26, 2019

(54) ENVIRONMENTAL MAPPING SYSTEM

(71) Applicant: DAQRI, LLC, Los Angeles, CA (US)

(72) Inventors: Erick Mendez, Vienna (AT); Dominik Schnitzer, Vienna (AT); Bernhard Jung, Perchtoldsdorf (AT); Clemens Birklbauer, Enns (AT); Kai Zhou, Wr. Neudorf (AT); Kiyoung Kim, Vienna (AT); Daniel Wagner, Vienna (AT); Roy Lawrence Ashok Inigo, San Diego, CA (US); Frank Chester Irving, Jr., Woodland Hills, CA (US); Brian Mullins, Altadena, CA (US); Lucas Kazansky, Los Angeles, CA (US); Jonathan Trevor Freeman, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 15/861,401

(22) Filed: Jan. 3, 2018

(65) Prior Publication Data

US 2018/0190017 A1 Jul. 5, 2018

Related U.S. Application Data

(60) Provisional application No. 62/442,407, filed on Jan. 4, 2017.

(51) Int. Cl.
*G06T 15/30* (2011.01)
*G06T 17/20* (2006.01)
(Continued)

(52) U.S. Cl.
CPC .............. *G06T 17/20* (2013.01); *G06T 17/00* (2013.01); *G06T 19/006* (2013.01);
(Continued)

(58) Field of Classification Search
CPC ....... G06T 17/20; G06T 17/205; G06T 15/04; G06T 15/005; G06T 11/40
(Continued)

(56) References Cited

U.S. PATENT DOCUMENTS 9,740,083 B1 * 8/2017 Hennings ........... H05B 33/0872
9,865,058 B2 * 1/2018 Mullins ................. G06T 19/006
(Continued)

OTHER PUBLICATIONS

Salman, N. From 3D point clouds to feature preserving meshes,Date 2010, [Online}, [Retrieved on Feb. 5, 2019. Retrieved from the Internet: <URL: https://tel.archives-ouvertes.fr/tel-00536984/file/SALMAN_THESIS.pd> (Year: 2010).*

*Primary Examiner* — Gordon G Liu
(74) *Attorney, Agent, or Firm* — Schwedman Lundberg & Woessner, P.A.

(57) ABSTRACT

An augmented reality (AR) display application generates mapped visualization content overlaid on a real world physical environment. The AR display application receives sensor feeds, location information, and orientation information from wearable devices within the environment. A tessellation surface is visually mapped to surfaces of the environment based on a depth-based point cloud. A texture is applied to the tessellation surface and the tessellation may be viewed overlaying the surfaces of the environment via a wearable device.

18 Claims, 12 Drawing Sheets
(3 of 12 Drawing Sheet(s) Filed in Color)

(51) Int. Cl.
*G06T 19/00* (2011.01)
*G06T 17/00* (2006.01)
*G02B 27/01* (2006.01)

(52) U.S. Cl.
CPC ........ *G02B 27/017* (2013.01); *G06T 2210/56* (2013.01); *G06T 2215/12* (2013.01); *G06T 2215/16* (2013.01)

(58) Field of Classification Search
USPC ........................................................ 345/423
See application file for complete search history.

(56) References Cited

U.S. PATENT DOCUMENTS

2007/0036467 A1* 2/2007 Coleman ............... G06T 3/4061
382/294
2010/0172567 A1* 7/2010 Prokoski ............. A61B 5/0064
382/132

* cited by examiner

ENVIRONMENTAL MAPPING SYSTEM

RELATED APPLICATION

This application claims the benefit of priority of U.S. Provisional Application No. 62/442,407, filed Jan. 4, 2017, which is herein incorporated by reference in its entirety.

TECHNICAL FIELD

The subject matter disclosed herein generally relates to the processing of data. Specifically, the present disclosure addresses systems and methods for generating a virtual model and providing a dynamic visualization of components in relation to the virtual model.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present application, or any embodiments thereof, to anything stated or implied therein or inferred thereupon. By way of educational background, an aspect of the prior art is that a device can be used to generate and display data in addition to an image captured with the device. For example, conventional display systems can typically display arbitrary image objects in relation to a visualization of a real-world environment.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee. Some embodiments are illustrated by way of example and not limitation in the figures of the accompanying drawings.

DETAILED DESCRIPTION

Figure 1:
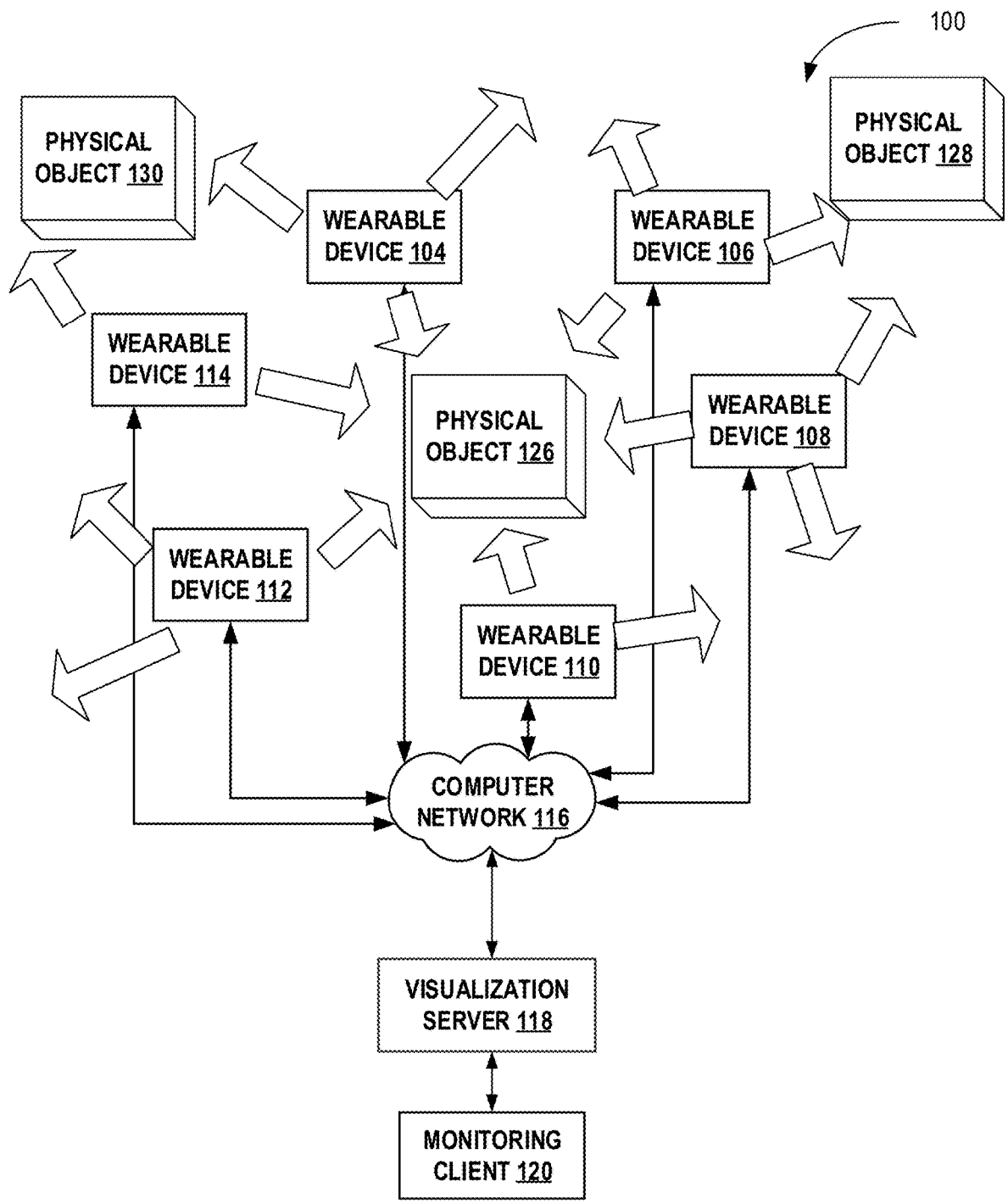
FIG. 1 illustrates a block diagram of an exemplary network architecture suitable for a mapping system, according to some example embodiments.

As will be further described below, Augmented Reality (AR) may be a live, direct or indirect view of a physical, real-world environment whose elements can be augmented using computer-generated sensory input such as, and without limitation, sound, video, a multiplicity of electromagnetic spectrum data, graphics, local position information, thermal data, GPS data, and/or other sensor detected data. Furthermore, with the help of advanced AR technology (e.g., adding computer vision, object recognition, and other complimentary technologies), information about the surrounding real world of a user may become interactive. Device-generated (e.g., artificial) information about the environment and its objects can be overlaid on the real world via one or more displays.

Example methods and systems are directed to data manipulation based on real world object changes and/or manipulations. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality applications allow a user to experience information, such as, and without limitation, in the form of a three-dimensional virtual object overlaid on an image of a physical object captured by a camera of a wearable device, two-dimensional mage information related to an imaged environment or particular object, three-dimensional reconstructions of imaged environments and/or particular objects, remote viewing and manipulation of the three-dimensional reconstructions, virtual objects, and two-dimensional image information, or substantially any virtual content actuated in response to a detectable position, event, appearance, and/or time. The physical object may include a visual reference that the augmented reality application can identify. A visualization of the additional information, such as the three-dimensional virtual object overlaid or engaged with an image of the physical object is generated in a display of the device. The three-dimensional virtual object may be selected based on a recognized visual reference or captured image of the physical object. A rendering of the visualization of the three-dimensional virtual object may be based on a position of the display relative to the visual reference.

In some examples, a three-dimensional model of an environment can be stored as data in a point cloud. The point cloud can include a set of data points representing locations in a three-dimensional coordinate system. In some examples, the data points can include color information, depth information, location information, and other sensor based information. Display devices can retrieve data from the point cloud and render realistic images of the environment from the retrieved data. Other augmented reality applications allow a user to experience visualization of the additional information overlaid on top of a view or an image of any object in the real physical world. The virtual object may include exemplary, and without limitation, three-dimensional virtual objects, two-dimensional virtual objects, object related data, and/or other visual indicia related to the real physical world. For example, the three-dimensional virtual object may include a three-dimensional view of a chair, an animated character, or functional information related to an imaged object. The two-dimensional virtual object may include a two-dimensional view of a dialog box, menu, or written information such as statistics information for a baseball player. The three-dimensional reconstruction may include an interactive virtual environment reconstructed from one or more sensing devices and/or wearable devices. An image of the virtual object and/or reconstruction may be rendered at one or more wearable device and/or other display systems such as, and without limitation, remote computing clients including computers, mobile phones, and other computing and display devices.

Multiple wearable devices (e.g., mobile devices that include a camera and a display) looking at a same environment (e.g., a room) and/or physical objects from different angles and locations may be further used to generate and reconstruct a three-dimensional interactable image of the environment and/or physical objects. A system and method for a visualization system taking advantage of the multiple wearable devices is described. A visualization application compiles data of components associated with a three-dimensional model of the environment. For example, components may include, without limitation, nails on drywall, turbines and engines, switches on a dashboard, ventilation and heating ducts, buttons on a factory machine, pipes, a boat, or substantially any physical objects and spaces.

The visualization application receives for example, and without limitation, video feeds, RGB color data, location information, depth information, thermal information, orientation information, and/or other sensor gathered data from the wearable devices. The three-dimensional model of the environment can be generated based on, for example, and without limitation, video feeds, RGB color data, location information, depth information, thermal information, and/or orientation information from the wearable devices. Analytics may be performed from the video feeds, RGB color data, location information, depth information, thermal information, and/or orientation information to identify a manipulation or change on imaged objects (e.g., a nail is being hammered into a wall, a button is switched on a dashboard, a change in position and/or a temperature of an environmental object). The three-dimensional model of the object may be updated based on the manipulation and/or change on the object. A dynamic status related to the manipulation on the object is generated with respect to reference data related to the object. A historical record of components associated with the three-dimensional model of the object is generated.

In some exemplary embodiments, manipulations of an object comprise a modification of an existing component on the object (e.g., a switch on a wall), an addition of a new component to the object (e.g., a nail in a wall), or a removal of an existing component on the object (e.g., a handle from a door).

In some exemplary embodiments, changes of a physical object may include, for example, and without limitation, changes in temperature (e.g., a pipe or valve increasing or decreasing in temperature, ambient environmental temperature changes, etc.) a position of an object changing (e.g., a previously recorded item being moved, exploding, and/or otherwise disappearing).

In many exemplary embodiments, changes and/or manipulations of the environment and objects within the environment may be stored with respect to time, thus providing a historical tracking of the changes and manipulations. A user, via a graphical user interface (GUI), may identify and display one or more particular image data sets of an environment and/or objects within the environment related to a corresponding time.

In one example embodiment, an AR device includes a wearable device such as a head mounted device (e.g., a helmet, a visor, eyeglasses). The AR device includes a transparent display, sensors, an AR application, and a predictive analytic detection engine implemented in one or more processors. The transparent display includes lenses that are disposed in front of a user's eyes (while wearing the helmet or head mounted device) to display AR content (e.g., virtual objects). The AR application renders the AR content for display in the transparent display of the AR device. The sensors generate sensor data. The sensor data may include AR device-based sensor data related the AR device (e.g., a geographic location of the AR device, an orientation and position of the AR device, depth data and thermal data of surfaces of an environment being imaged), and ambient-based sensor data related to an ambient environment of the AR device (e.g., ambient temperature, ambient humidity, ambient light, ambient pressure). In one example embodiment, the sensors include a first set of sensors to generate the AR device-based sensor data, and a second set of sensors to generate the ambient-based sensor data. Examples of the first set of sensors include an optical camera, IR camera, thermal sensor, GPS sensor, and an Inertial Measurement Unit (IMU). Examples of the second set of sensors include an audio sensor, a barometer, a humidity sensor, a thermal sensor, and an ambient light sensor.

In another example embodiment, the AR device further includes a processor comprising a Visual Inertial Navigation (VIN) module, wherein an independent position or relative position of the AR device may be tracked in space using sensors and the VIN module in the AR device. The VIN module estimates an accurate position, velocity, and orientation (also referred to as state information) by combining visual cues with inertial information. The processor of the AR device is configured to synchronize a plurality of video frames with the IMU data, compute a first estimated spatial state of the device based on the synchronized plurality of video frames with the IMU data, compute a second estimated spatial state of the device based on the radio-based sensor data, and determine a spatial state of the device based on a combination of the first and second estimated spatial states of the device.

In another example embodiment, the AR device may provide high fidelity (e.g., within several centimeters) absolute (global) positioning and orientation. The AR device performs sensor fusion amongst the several sensors in the device to determine the AR device's absolute location. For example, the AR device provides six degrees of freedom (6DOF) pose data at 100 Hz. This can include latitude, longitude, and altitude. The AR device combines data from all the sensors while one or more sensors lose and gain data collection. The camera may include a fisheye camera. The sensors may include IMUs (gyroscope and accelerometer), barometers, magnetometers, and radio-based sensors such as, and without limitation, ultra-wideband (UWB) input/output (I/O) (for UWB localization) and GPS.

The AR device may be a computing device capable of generating a display of virtual content or AR content layered on an image of a real-world object. The AR device may be, for example, a head-mounted device, a helmet, a watch, a visor, and eyeglasses. The AR device enables a wearer or user to view the virtual object layers on a view of real-world objects. The AR content may be generated based on the position and orientation of the AR device.

AR usage relies on very accurate position and orientation information with extremely low latency to render AR content over a physical scene on a transparent display. For example, an optimized VIN system can run at video frame rate, typically 60 Hz. With an IMU of a much higher data rate, typically 1000 Hz, accurate state information can be obtained with minimal latency for rendering. Since visual cues are used by VIN to correct IMU drift, IMU rate state information can still be very accurate. VIN can be extended to include other sensor inputs, such as GPS, so it can output state information in globally referenced coordinates. This consistent state information in turn can be used along with other sensors, for example, depth sensors, to construct a precise three-dimensional map.

The VIN module computes a position and an orientation based on a combination of sensor data from one or more sensors (e.g., image capture devices and depth sensors), inertial data from an inertial sensor, and radio-based sensor data from the radio-based sensor. In some example embodiments, the VIN module includes an algorithm that combines information from the inertial sensor, the radio-based sensor, and the one or more sensors.

The VIN module may track, for example, the following data in order to compute the position and orientation in space over time:

Stationary world points $(x_i, y_i, z_i)$ where i represents the $i^{th}$ world point,
Gyroscope measurements $(g_{xt}, g_{yt}, g_{zt})$,
Accelerometer measurements $(a_{xt}, a_{yt}, a_{zt})$,
Gyroscope bias $(bg_{xt}, bg_{yt}, bg_{zt})$, and
Accelerometer bias $(ba_{xt}, ba_{yt}, ba_{zt})$, where t is time. The VIN module may generate a three-dimensional map that consists of an (x, y, z) for each stationary point in the real physical world being tracked.

The viewing device may include a system for real-time texture mapping for an AR reality system. In one example embodiment, the viewing device includes an optical sensor, a texture extraction module, and a texture mapping module. The optical sensor captures an image of an environment or of a real-world object within the environment. The texture extraction module of the viewing device extracts a texture such as, and without limitation, color, depth data, thermal data, or other characteristics of the real-world object or environment. For example, the real-world object may include a drawing of a cartoon character on a piece of paper. The user may have colored the cartoon character using colored crayons, pencils, or markers. The texture extraction module extracts the pattern and color of a picture of the colored cartoon character. For example, the texture extraction module extracts the color, pattern, and texture of the coloring (e.g., watercolor texture, crayon texture, pencil texture) within a predefined outline of the cartoon character. The texture mapping module then maps the texture extracted from the image of the real-world object to a virtual object associated with the real-world object. For example, the extracted texture may be mapped to a texture of a three-dimensional model of the virtual object. Using the previous example, the color, pattern, and texture from the colored cartoon character is mapped to the surface of the three-dimensional model of the same cartoon character. The texture extraction module works in conjunction with the texture mapping module to dynamically map updates from the extracted texture to the virtual object in real time. As such, changes to the texture of the image of the colored cartoon are applied and mapped to the virtual object in real time. For example, the texture of the virtual object is dynamically updated in real time as the user colors the drawing of the cartoon character on the piece of paper. As such, the viewing device does not have to re-initiate recognition of the real-world object, re-render a three-dimensional model of a virtual object associated with the recognized real-world object, or re-map the new texture to the re-rendered three-dimensional model.

In some example embodiments, the viewing device includes a display, an optical sensor, and a hardware processor. The hardware processor includes an AR application comprising a recognition module, a texture extraction module, and a texture mapping module. The recognition module identifies the real-world object and retrieves a virtual content associated with the real-world object. The recognition module may further retrieve characteristics (e.g., specific animation, behavior, color, effect) that are based on the texture in the image of the real-world object. The texture extraction module captures an image of a real-world object with the optical sensor and extracts a texture of the image of the real-world object. The texture may include a color and a visual pattern in an image of the real-world object. The texture mapping module retrieves a virtual object corresponding to the identified real-world object, maps the texture to the virtual object, dynamically updates the texture to the virtual object in real time, and generates a visualization of the virtual object in a display of the viewing device.

In another example embodiment, the texture extraction module identifies one or more predefined areas in the image of the real-world object and extracts one or more textures from the one or more predefined areas in the image of the real-world object.

The texture mapping module may map the texture of a predefined area in the image of the real-world object to a corresponding area of the virtual object. For example, the texture mapping module maps the texture of the predefined area to a corresponding surface in a three-dimensional model of the virtual object.

The texture mapping module may retrieve the virtual content and characteristics of the virtual content corresponding to a recognized image of the real-world object. The texture mapping module detects changes in the texture in the image of the real-world object, identifies portions of the image of the real-world object with texture changes, and dynamically updates in real time a mapping of texture to parts of the virtual content corresponding to the portions of the image with texture changes. The texture mapping module also renders a three-dimensional model of the virtual content in the display of the viewing device. The three-dimensional model may be visually perceived in the viewing device as an overlay on top of the captured image using the viewing device.

Texture mapping may also include thermal sensors in the AR device to generate thermal data related to an imaged environment and physical objects detected by the AR device. The predictive analytic detection engine may identify a thermal anomaly based on a context of the environment and/or physical objects, the thermal data of the environment and/or physical objects, and thermal parameters, and generate a notification in response to the identified thermal anomaly. The AR application causes a display of AR content comprising identifying the physical object associated with the thermal anomaly in the transparent display.

In some example embodiments, a user wears the AR device. The AR device maps out the environment with thermal data when all equipment or machinery may be inspected and behaving normally. The AR device can also generate depth data associated with the equipment and machinery. For example, a depth sensor (e.g., an infrared projector and infrared camera) measures the depth of objects in an image captured by the AR device. A server stores the thermal data, which is updated whenever any equipment is replaced or moved. On a regular basis, users can wear the AR device while the IR camera and depth sensor records thermal data and depth data in the background. The thermal data can be combined with the depth data to determine the temperature of each component or machine. The AR device compares the thermal and depth data with recorded reference data to determine whether a thermal anomaly exists. For example, if the temperature for an area is measured to be significantly higher than a previous recording and/or a predetermined threshold, (e.g., by more than 10 degrees), this data is recorded and sent to a server. This data can then be used for alerts, AR content generation, and work ticket generation.

The predictive analytic detection engine can receive the thermal parameters from a server and/or generate the thermal parameters locally on the AR device. The server can generate the thermal parameters based on the context of the physical objects and the thermal data. For example, and without limitation, a user with the AR device walks in a factory room filled with machines, duct, pipes, or substantially any other potentially temperature varying objects. The AR device scans the environment, maps the objects, and determines the thermal data associated with each object. The thermal data may be associated with an operating status of the objects (e.g., functional, no defect, running time). In another example embodiment, the context of the thermal data may be determined based on a series of user activities. For example, the maximum temperature for a component may be $t1_{max}$ after the user operates switch S1, then turns on valve V1. The maximum temperature for the same component may be $t2_{max}$ after the user turns on valve V2 after the user turns on valve V1.

The predictive analytic detection engine may identify one or more sensor data sets exceeding one of the preconfigured thresholds specified in the thermal parameters and context of the objects (received from the server or generated locally at the AR device), and augment correction information based on the identified sensor data exceeding one of the thresholds of the thermal parameters. For example, the correction information may include instructions for the user to remedy a thermal anomaly by operating a physical object identified by the AR device and within reach of the user (e.g., a layer of virtual arrows is displayed on top of a physical valve in the transparent display to show the user the direction in which to turn off a valve causing or associated with the thermal anomaly). In another example, the correction information may include instructions for the user to minimize exposure to the thermal anomaly (e.g., a layer of a virtual path of an evacuation route is displayed on top of the physical ground in the transparent display to guide the user to an exit). In another example, the AR content includes instructions (e.g., text) to the user of the AR device and a three-dimensional model to visualize the instructions (e.g., animated virtual character pointing to an exit path).

In another example embodiment, the predictive analytic detection engine may access historical thermal data corresponding to user tasks provided by the AR application. Examples of user tasks include operating a particular machine, fixing a component, or maintaining a machine. For example, the AR application provides step by step instructions to the user for operating a machine. At each step, the user tasks are recorded along with the corresponding sensor data resulting from each user task. For example, the AR application may display a virtual arrow above a valve of a machine to indicate the direction in which to rotate the valve. The AR application determines that the user has turned the valve by detecting a change in the position of the valve (either by using sensors connected to the valve or using image recognition to visually determine a different position of a valve). The predictive analytic detection engine analyzes sensor data in response to the user turning the valve. For example, sensors of the AR device measure the temperature of a conduit connected to the valve. After the valve has turned, the AR application displays the next step, such as a virtual button corresponding to a physical button of the machine, and instructs the user to press on the physical button. Once the AR application determines that the button has been pressed, the predictive analytical detection engine analyzes measured sensor data in response to the pressed button. For example, the predictive analytic detection module analyzes a temperature of a component associated with the button measured by the sensors of the AR device. Therefore, the historical sensor data includes historical sensor data associated with each step of a user task. For example, the pressure of conduit C may change from pressure p1 to pressure p2 in response to the user turning the valve. Similarly, the temperature of component C may change from temperature t1 to temperature t2 in response to the user pushing button B.

The predictive analytic detection engine may use the historical thermal data to identify user actions that resulted in a negative outcome. A negative outcome may be defined based on preconfigured parameters for the sensor data. The negative outcome may be identified when one of the sensor data exceeds a predefined safety threshold. For example, the negative outcome is identified when a pressure exceeds a predefined safety threshold temperature for the valve. The predictive analytic detection engine then identifies the cause of the negative outcome (e.g., user turned the valve).

Object recognition may be performed on the video feeds to identify objects within an environment and one or more components on the object (e.g., nails on a wall). A dynamic status may be maintained that includes an identification of a type of change, manipulation, and/or action on the object using key states or properties (e.g., unhammered nail, painted surface, gluing phase, hammering phase, etc.), an identification of a tool used in the manipulation on the object (e.g., hammer, saw, etc.), a location of the manipulation relative to the three-dimensional model of the object (e.g., nails hammered on the side panel of a boat), and an identification of the wearable device associated with the manipulation on the object (e.g., user of wearable device A is the one using the hammer).

Depth imaging may be performed within an environment, thereby providing depth information of objects and components within the environment with respect to one or more wearable devices used to capture the environment. Infrared projectors and infrared cameras of the wearable device can work in conjunction with the infrared cameras recording reflected infrared projection patterns and generating point clouds, wherein point clouds comprise detected distances between a surface and the wearable device within the environment. In one example embodiment, a user wears the AR device. The AR device maps out the environment with thermal data at a present instant. The AR device can also generate depth data associated with the environment. For example, a depth sensor (e.g., an infrared projector and infrared camera) measures the depth of objects in an image captured by the AR device while also recording thermal data. A server stores the thermal data, which may be updated with respect to a particular surface over time. On a regular basis, users can wear the AR device while the IR camera and depth sensor records thermal data and depth data in the background. The thermal data can be combined with the depth data to determine the temperature of each surface of the imaged environment. The AR device may compare the thermal and depth data with recorded reference data to determine whether a thermal anomaly exists. For example, if the temperature for an area is measured to be significantly higher (e.g., by more than 10 degrees), this data is recorded and sent to a server. This data can then be used for alerts, AR content generation, work ticket generation, and/or other post processing.

In another example embodiment, reference data may include a three-dimensional model of an environment and/or reference objects within the environment (e.g., boat, car, building, floor of building), a reference process (e.g., phase 3 is to build the frame, phase 4 is install plumbing) for completing the reference object (e.g., a house), and a reference compliance related to the reference process (e.g., there should be four brackets or braces per beam, there should be one outlet per location or drywall, an object or component should be within a predetermined temperature range and/or at a particular location) associated with time.

In another example embodiment, a visualization system can use a Simultaneous Localization and Mapping (SLAM) algorithm to create a model of an environment, such as a room or a city block, from sensor data obtained from one or more AR devices, from one or more images and/or sensor data recorded from the environment. The one or more AR devices may capture sensor data of portions of the environment from different locations and/or different angles. The sensors of the AR devices may generate RGB data, depth data, orientation data, thermal data, and/or other detected sensor data for each pixel in each image. A server can compile the generated RGB, depth data, thermal data, and/or other detected sensor data to form a point cloud that represents locations of surfaces in the environment in a three-dimensional coordinate system.

To fill or fix any holes or other deficiencies in the point cloud, a system can learn a pattern of data points in the point cloud that surrounds the missing point(s) in the data cloud, can guess what the missing point(s) would look like based on the learned pattern, and can add and/or replace points in the data cloud based on the guess. For example, in a case of imaging a furnished space, a table may block a portion of the leg of a chair, and the system can learn what a chair leg looks like. The system can learn properties of chair legs, such as taper and shape, orientation, and so forth, with respect to a seat of the chair and the other chair legs, color, surface finish, and so forth. Based on data points in the point cloud that correspond to locations above and locations below the occluded portion of the chair leg, the system can add and/or replace points in the occluded portion. It is contemplated that new and/or replaced points in the point cloud are not merely interpolations between the non-occluded locations of the chair leg, such as three-dimensional primitives (2D planes in three dimensions, three-dimensional ellipsoids, and so forth). Instead, the new and/or replaced points in the point cloud can include learned properties of chair legs, such as taper, shape, surface finish, and so forth.

Such a system can use a deep learning framework to learn one or more patterns, which can be used to fill or fix any holes or other deficiencies in the point cloud. Extracting the pattern or patterns from the color and shape information (RGB data or RGB-D (color and depth) data) can be referred to as training, or training the system. Training can require significant computing power and can be executed on a server or a workstation.

In another example embodiment, the dynamic status related to the changes and/or manipulations on the object is updated. A dynamic progress status may identify a completion status of the object with respect to the reference object. A non-compliant based on the change and/or manipulation on the object in relation to the reference compliance is identified. An inventory of components on the object is stored. A history of changes and/or manipulations of the environment and/or components and corresponding wearable devices are generated. Communication between two or more wearable devices determined based on the corresponding change and/or manipulation of the object is enabled. The texture mapping module may also dynamically update in real time a rendering of portions of the three-dimensional model of the virtual content corresponding to the portions of the image with texture changes. The texture extraction module extracts a texture of an image of the real-world object on a periodic basis. The texture mapping module updates a mapping of the texture to the virtual object on the periodic basis.

In many exemplary embodiments, a visualization module may render a three-dimensional reconstruction of a viewed environment and/or an object within the environment based on one or more of a combination of depth data, thermal data, IMU position and/or orientation data, and VIN position and/or orientation data, wherein a user may select particular data to be included in the rendering. The visualization may involve a depth based point cloud used to generate and augment a tessellation mapped to surfaces of the environment. Rendered texture data may also be fit to the tessellation, such that viewing an environment can include an augmented depth based tessellation image with texture mapped to real world surfaces of the environment, wherein the texture data may include, for example, and without limitation, thermal data, RGB color data, and/or other recorded sensor data. In some exemplary embodiments, a predetermined portion of a wearable device display may be designated as a region of interest wherein environmental regions viewed within the region of interest can include augmented texture data rendered at a first opacity. Furthermore, a multiplicity of portions of the wearable device display outside of the designated region of interest can include augmented texture data rendered at a multiplicity of opacities respectively, wherein the multiplicity of opacities may be greater than the first opacity. In some embodiments, the texture rendering at the multiplicity of opacities may be based on a spatial characteristic, temporal characteristic, or a combination thereof. In some embodiments, the visualization module may render a three-dimensional reconstruction of a viewed environment and/or object within the environment based on one or more received rendering preference from a user.

The texture extraction module may extract a texture of an image of the real-world object on a periodic basis. The texture mapping module updates a mapping of the texture to the virtual object in response to potentially detecting changes in the texture of the image of the real-world object.

In another example embodiment, the non-compliance of a first change and/or manipulation on the object is identified. A first wearable device corresponding to the first change and/or manipulation on the object is identified. A second wearable device associated with a second change and/or manipulation dependent on the first change and/or manipulation is identified. The second wearable device of the non-compliance of the first change and/or manipulation on the object is notified.

In another example embodiment, a first wearable device associated with a first change and/or manipulation on an object is identified. A second wearable device associated with a second change and/or manipulation related to the first change and/or manipulation is identified. Communication between the second wearable device and the first wearable device is enable in response to receiving a request for assistance on the first change and/or manipulation on the object from the first wearable device.

In another example embodiment, a request for environmental data may be received at a server from, for example, and without limitation, one or more wearable devices, desktop workstations, and other computing device clients capable of network communication and display. For example, and without limitation, the request may include a query for a location of a component related to a change and/or manipulation on an object, data of one or more generated three-dimensional environmental mappings, and current or historical reference mapping data related to one or more wearable devices and imaged environments. The requested data is identified and communicated to the client for visualization. For example, and without limitation, reference data may include thermal data of an environment captured via thermal sensors and/or depth data captured via depth sensors, wherein either or both forms of data can be used to reconstruct an interactable 3D model of the environment on the client device. In particular, a structured reference dataset includes pre-combined models and inventories. Unstructured reference data may be collected through real-time system use, which can be interpreted on the fly, without anticipation of specific use cases or pre-existing constructs.

In another example embodiment, a non-transitory machine-readable storage device may store a set of instructions that, when executed by at least one processor, causes the at least one processor to perform the method operations discussed within the present disclosure.

FIG. 1 illustrates a block diagram of an exemplary network environment 100 suitable for a mapping system, according to some example embodiments. The network environment 100 includes a multiplicity of wearable devices, a sampling denoted here as wearable devices 104, 106, 108, 110, 112, and 114, a monitoring client 120, and a visualization server 118, communicatively coupled to each other via a computer network 116. The wearable devices 104, 106, 108, 110, 112, 114, monitoring client 120, and visualization server 118 may each be implemented in a computer system, in whole or in part, as described below with respect to FIGS. 13 and 14. The visualization server 118 may be part of a network-based system. For example, the network-based system may be or include a cloud-based server system that provides additional information, such as three-dimensional models and locations of components or items relative to the three-dimensional model, to the wearable devices 104, 106, 108, 110, 112, 114, and the monitoring client 120.

Each wearable device may be worn or held by a user observing a real-world environment including one or more physical objects, a sampling of physical objects denoted here as physical objects 126, 128, and 130. For example, the user may be a construction worker for a building. The user is not part of the network environment 100, but is associated with the corresponding wearable device. For example, each wearable device may be a computing device with a display such as a head mounted computing device with a display and a multiplicity of sensors. The display and sensors may be disposed on separate devices but may be communicatively connected. The computing device may be hand held or may be removably mounted to a head of the user. In one example, the display may be a screen that displays what is captured with sensors of the wearable device. In another example, the display of the device may be transparent such as in lenses of wearable computing glasses. In other examples, the display may be a transparent display such as a windshield of a car, plane, or truck. The display may be non-transparent and wearable by the user to cover the field of vision of the user.

The wearable devices 104, 106, 108, 110, 112, and 114 may be worn by users located at different locations within the physical environment and may potentially view one or more of the physical objects. For example, and without limitation, physical object 126 may be a boat under construction, physical object 128 may be a duct of a construction site floor, and physical object 130 may be a person sitting at a computer terminal, while each wearable device may be mounted to the helmet of construction workers working on the boat at a construction site. The construction workers may be located at different locations around the boat. The construction workers may thus view different parts of the one or more objects and environment at the same time. The construction workers may be users of an application in the corresponding wearable device that allows them to augment their view of the objects with a virtual three-dimensional model of the objects and environment. For example, the application may include an augmented reality application configured to provide the construction workers with an experience triggered by parts of the objects, a two-dimensional physical object (e.g., a marking on a door), a three-dimensional physical object (e.g., a statue located on an entrance), a location (e.g., main deck, port, starboard), or any visual or non-visual references (e.g., perceived corners of walls or furniture) in the real world physical environment. For example, the construction worker may point sensors (e.g., camera, depth sensors, thermal sensors) of the corresponding wearable device to capture images and environmental information. In some embodiments, imaged objects may be tracked and recognized locally in the wearable device using a local database such as a context recognition dataset module of the augmented reality application of the wearable device. The local context recognition dataset module may include a library of virtual objects associated with real-world physical objects or references. The augmented reality application then generates additional information corresponding to the image (e.g., a three-dimensional model) and presents this additional information in a display of the wearable device in response to identifying the recognized image. If the captured image is not recognized locally at the wearable device, the wearable device downloads additional information (e.g., the three-dimensional model) corresponding to the captured image, from a database of the visualization server 118 over the network 116.

The wearable devices 104, 106, 108, 110, 112, and 114 may be used to capture video, images, depth data, thermal data, and other sensor data from different angles within the environment. In one example embodiment, the wearable devices 104, 106, 108, 110, 112, and 114 may broadcast a sensor feed of what the corresponding users are looking at to the visualization server 118. In another example, the wearable devices 104, 106, 108, 110, 112, and 114 capture sensor data at periodic intervals and broadcast it to the visualization server 118. In another example, the wearable devices 104, 106, 108, 110, 112, and 114 broadcast sensor data at regular intervals and/or based on their geographic location relative to each other and to the one or more physical objects. For example, sensor data may be recorded in a sequential pattern such as clockwise or counter-clockwise around the environment. Other examples include a combination of first recorded sensor data from wearable devices 104 and 114, and second recorded sensor data from wearable devices 106 and 108, wherein the first sensor data may be, for example, and without limitation, depth data and thermal data, and the second sensor data may be optical image data. The pattern of recorded sensor data may alternate based on movement, location, and orientation of each wearable device. For example, if the wearable device is looking away from the physical object 128, the rate of capture may be decreased or no image may be captured. In another example, if some of the wearable devices are located closer to each other relative to the proximity between the remaining wearable devices, the wearable devices that detect that they are close to each other may capture and broadcast sensor data at a lower rate. Similarly, wearable devices that are relatively more distant from other wearable devices may capture and broadcast sensor data at a higher rate.

Recorded data (e.g., image data using a camera, location and orientation data using IMU, VIN, and/or radio-based sensors, thermal and depth data using IR sensors) received from the wearable devices 104, 106, 108, 110, 112, and 114 may be used to reconstruct and generate a three-dimensional model of the environment and physical objects within the environment. For example, data captured with the wearable devices worn on construction workers at a shipyard may start capturing images/video, depth data, and/or thermal data as soon as they are in proximity to the boat being built or when a distance or radius threshold is crossed. In some embodiments, 2D images from different angles and locations around the boat may be used to reconstruct a three-dimensional model of the boat being built using common computer vision systems with three-dimensional object recognition algorithms. In many embodiments, portions of point clouds may be generated from the wearable devices from different angles and locations around one or more objects and combined to reconstruct a three-dimensional model of the one or more objects with respect to depth information. The three-dimensional reconstruction model may be acting as an automatic post-processing step or on pull as actively related to a new query or equation introduced into the system well after the original data capture took place.

Furthermore, the data received from the wearable devices 104, 106, 108, 110, 112, and 114 may be provided to a computer vision object recognition system for filing and identifying objects in images and video frames. In one embodiment, the object recognition system may be part of the visualization server 118. As such, the data from wearable devices 104, 106, 108, 110, 112, and 114 may be used to reconstruct a three-dimensional model of one or more physical objects but also to keep an inventory of recognized objects. For example, the visualization server 118 may keep track of how many nails have been put in a panel on the east side of the boat, who last used a hammer, when the hammer was used, and where the hammer was used. The visualization server 118 may also be used to compare a current three-dimensional model of an environment or objects within an environment with a previous three-dimensional model of the environment or objects within the environment. In another example, the visualization server 118 may be used to identify or alert a wearable device based on a compliance issue detected based on the data received from the wearable device and a reference data. For example, the visualization server 118 may detect that nails were hammered in a wrong location based on the reference data and notify the user of the corresponding wearable device.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 13-14. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The computer network 116 may be any network that enables communication between or among machines (e.g., visualization server 118), databases, and wearable devices. Accordingly, the computer network 116 may be a wired network, a wireless network (e.g., a mobile or cellular network), or any suitable combination thereof. The computer network 116 may include one or more portions that constitute a private network, a public network (e.g., the Internet), or any suitable combination thereof.

Figure 2:
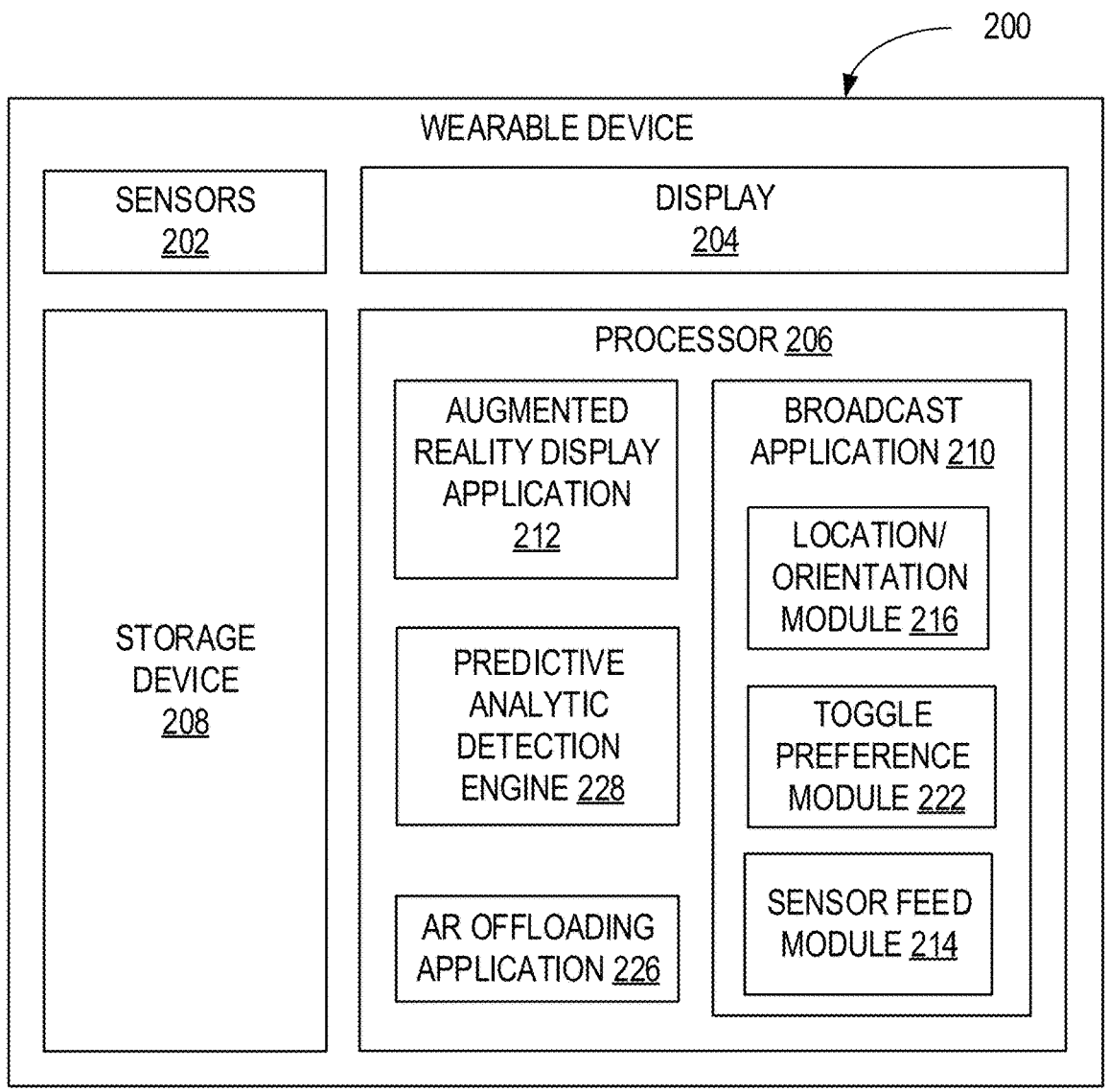
FIG. 2 illustrates a block diagram of an example embodiment of a component architecture of an exemplary wearable device.

FIG. 2 illustrates a block diagram of an example embodiment of a component architecture of an exemplary wearable device. The wearable device 200 includes sensors 202, a display 204, a processor 206, and a storage device 208. For example, the wearable device 200 may be a wearable computing device, a head mounted device (e.g., a helmet, a visor, eyeglasses), a vehicle computer, a tablet computer, a navigational device, a portable media device, and/or a smart phone of a user. The user may be a human user (e.g., a human being), a machine user (e.g., a computer configured by a software program to interact with the wearable device 200), or any suitable combination thereof (e.g., a human assisted by a machine or a machine supervised by a human).

The sensors 202 may include, for example, and without limitation optical sensors (e.g., camera), depth sensors (e.g., an infrared projector and infrared camera), thermal sensors (e.g., FLIR™ sensors, other thermal IR detectors), location and orientation sensors such as IMUs (e.g., gyroscope and accelerometer), and barometers, magnetometers, radio-based sensors such as, and without limitation, UWB I/O (for UWB localization), Bluetooth, GPS, an audio sensor (e.g., a microphone), or any suitable combination thereof. For example, the sensors 202 may include a rear facing camera and a front facing camera in the wearable device 200. It is noted that the sensors described herein are for illustration purposes and the sensors 202 are thus not limited to the ones described.

The display 204 may include, for example, a transparent or semi-opaque screen or monitor so that a user can see through display 204 (e.g., head-up display), wherein the display may further be configured to display images generated by the processor 206.

The processor 206 may include a broadcast application 210, an AR display application 212, a predictive analytic detection engine 228, and an AR offloading application 226. In one example embodiment, the broadcast application 210 is configured to communicate data from the wearable device 200 to the visualization server 118 and/or other wearable devices. For example, the broadcast application 210 may include a sensor feed module 214 and a location/orientation module 216. The sensor feed module 214 sends captured images and/or video frames, measured depth data, measured thermal data, position/orientation data, and other measured sensor data from sensors 202. The location/orientation module 216 may include a VIN module and be configured to determine the geographic location and an orientation of the wearable device 200. In some embodiments, the geographic location may also be determined using GPS, Wi-Fi, audio tone, light reading, and other means. A toggle preference module 222 may send a received user preference of a rendering option. Examples of rendering options include three-dimensional rendering of the depth based tessellation, 2D rendering of the depth based tessellation fit to an environment and/or environmental objects, and types of texture (e.g., RGB color data, grayscale color data, thermal data) applied to the tessellation.

The AR display application 212 may be configured to generate augmented data in the display 204 based on image data, sensor data, and preference data generated within wearable device 200 as well as data generated remotely. In some embodiments, the augmented data may be dynamically displayed based on a predetermined region of interest (ROI) of display 204.

The predictive analytic detection engine 228 identifies a thermal anomaly based on a context of the environment and/or physical objects, the thermal data of the environment and/or physical objects, and thermal parameters, and generates a notification in response to the identified thermal anomaly.

The AR offloading application 226 enables the wearable device 200 to offload data processing to an external computing device.

The storage device 208 may be configured to store a database of visual references (e.g., images, position data, thermal data) and corresponding experiences (e.g., three-dimensional virtual objects, interactive features of the three-dimensional virtual objects, visual indicia such as warnings). In another example embodiment, the storage device 208 also stores tessellation data and corresponding texture data.

Figure 3:
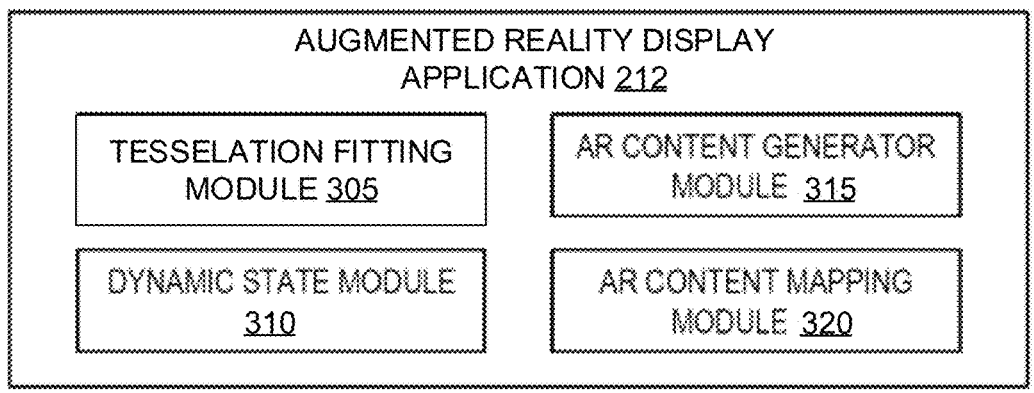
FIG. 3 illustrates a block diagram of an example embodiment of a software module architecture of an augmented reality display application.

FIG. 3 illustrates an exemplary software module architecture of AR display application 212, in accordance with an example embodiment. The AR display application 212 may include a dynamic state module 310, a tessellation fitting module 305, AR content generator module 315, and an AR content mapping module 320.

The dynamic state module 305 may receive data from the location/orientation module 216 and sensor feed module 214, wherein a latest spatial state (e.g., location, position, and orientation) of the wearable device 200 is identified based on IMU data, VIN module processing, data, image data, GPS, Wi-Fi, audio tone, light reading data, radio-based sensor data, or any combination thereof.

The tessellation fitting module 310 may generate a depth based three-dimensional point cloud by processing reflected light patterns captured from an IR camera sensor of the wearable device 200, wherein depth information of environmental surfaces may be encoded in the reflected light patterns from which reflection occurs. Vertices within the depth based point cloud may be computed to generate a depth based tessellation of the point cloud data, wherein the tessellation may be used for surface mapping.

Figure 11:
FIG. 11 illustrates screenshots of examples of a mapping visualization.
Figure 11:
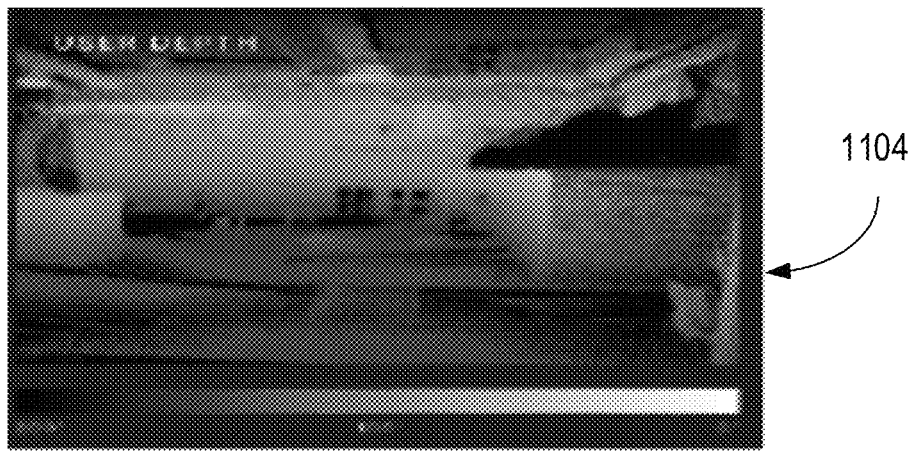
Figure 11:
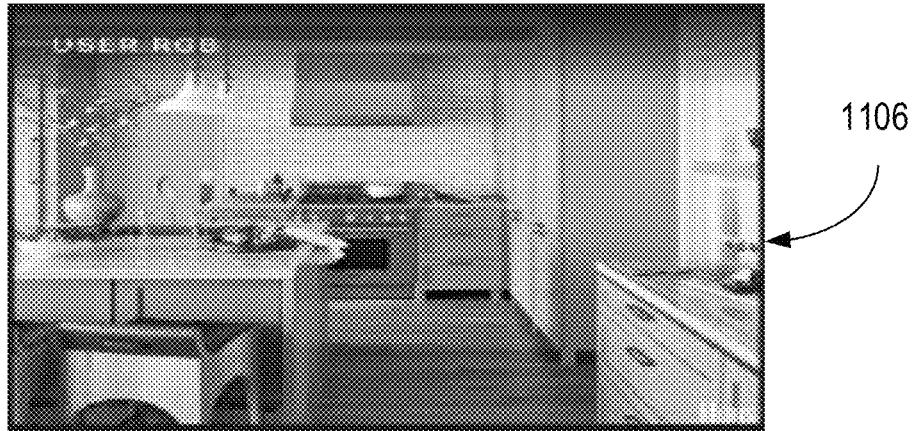

The AR content generator module 315 generates AR content using the generated tessellation and the spatial state of the wearable device 200. For example, the AR content may include visualization of data related to a physical object. The visualization may include a three-dimensional rendering of the depth based tessellation or a 2D rendering of the depth based tessellation fit to an environment and/or environmental objects. In some embodiments, a texture may be applied to the tessellation based on received sensor data of wearable device 200. For example, and without limitation, the texture data may include RGB color data, grayscale color data, thermal data, substantially any other receivable sensor data, or any combination thereof as illustrated in FIG. 11.

The AR content mapping module 320 maps the location of the AR content to be displayed in the display 204 based on the dynamic state (e.g., spatial state of the wearable device 200). As such, the AR content may be accurately displayed based on a relative position of the wearable device in space or in a physical environment. When the user moves, the inertial position of the wearable device is tracked, and the display of the AR content is adjusted by re-rendered and re-mapping the AR content to display a previously occluded (e.g. un-rendered) portion of the AR content based on the new inertial position. For example, the user may view a front portion of a virtual object visually perceived to be on a physical table. The position, location, and display of the virtual object is updated in the display 204 as the user moves around (e.g., away from, closer to, around) the physical table such that a side portion and then back portion of the virtual object is displayed as a user moves around the side and then back of the table. The display of the object may also shrink and expand as a user moves away from and towards the exemplary table respectively.

Figure 4:
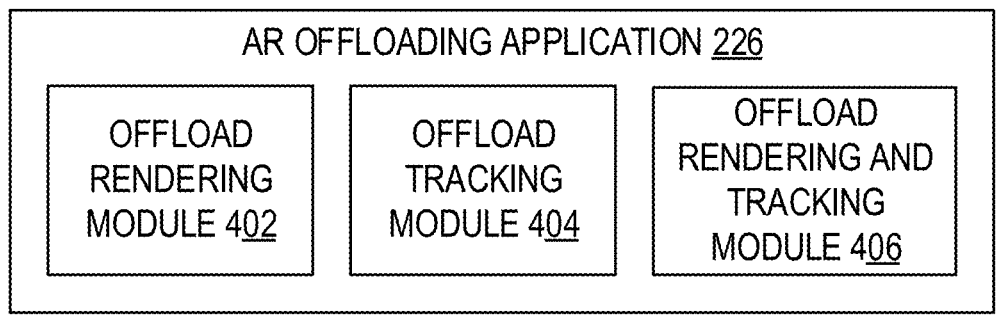
FIG. 4 illustrates a block diagram of an example embodiment of a software module architecture of an Augmented Reality offloading.

FIG. 4 illustrates an exemplary software module architecture of AR offloading application 226, in accordance with an example embodiment. The AR offloading application 226 may include an offload rendering module 402, an offload tracking module 404, and an offload rendering and tracking module 406. In some embodiments of the present application, one or more wearable devices may offload some processes (tracking and rendering of virtual objects to be displayed in the wearable device) using tracking sensors and computing resources of the visualization server 118. The tracking sensors may be used to track the location and orientation of the wearable device externally without having to rely on the sensors internal to the wearable devices. The tracking sensors may be used additively, as failsafe/redundancy, or for fine tuning. The tracking sensors may include optical sensors (e.g., depth-enabled three-dimensional camera), radio-based sensors (e.g. Bluetooth), GPS sensor, biometric sensors, and audio sensors to determine the location of one or more wearable devices, distances of the one or more wearable devices to the tracking sensors in the physical environment (e.g., sensors placed in corners of a venue or a room), and orientations of the one or more wearable devices to identify what is being viewed (e.g., direction at which the wearable device is pointed, wearable device pointed towards a player on a tennis court, wearable device pointed at a person in a room).

The computing resources of the visualization server 118 may be used to determine and render AR content based on the tracking data (generated internally with wearable device or externally with the tracking sensors). The augmented reality rendering is therefore performed on the visualization server 118 and streamed back to one or more corresponding wearable devices and/or to the monitoring client. As such, a wearable device does not have to compute and render any AR content and may display the already rendered virtual object in a display of the wearable device. For example, the augmented reality rendering may include a location of where a handle is to be installed per architectural specifications or city code.

The offload rendering module 402 may be used to offload only the rendering process to the visualization server 118 while still providing tracking data (using the sensors internal to the wearable device 200) to the visualization server 118. For example, the offload rendering module 402 may send tracking data to the visualization server 118. The visualization server 118 determines which virtual content or information to render based on the tracking data provided by the wearable device 200. The visualization server 118 renders the virtual content and sends the rendered virtual content to the wearable device 200. As such, the wearable device 200 does not have to use computing resources to render any virtual content.

The offload tracking module 404 may be used to offload only the tracking process to the visualization server 118 while rendering virtual content at the wearable device 200 using external tracking data provided to the wearable device 200. For example, the offload tracking module 404 may request the visualization server 118 to track the location and position of the wearable device 200 using sensors external to the wearable device 200. The visualization server 118 receives tracking data related to the wearable device 200 using sensors external to the wearable device 200. The visualization server 118 communicates the external tracking data to the wearable device 200. The wearable device 200 renders virtual content based on the external tracking data provided by the visualization server 118. As such, the wearable device 200 does not have to use or enable its tracking sensors. In another example, the external tracking data may be used to augment internal tracking data generated by the wearable device 200 for further accuracy. An example scenario of using the offload tracking module 404 includes a construction worker walking into an entrance of a construction site. Sensors placed throughout the construction site may detect the precise location of the construction worker and the orientation of the wearable device 200 of the construction worker to determine items that the construction worker is looking at. For example, the external tracking data may show that the construction worker is at construction site A and is looking down at the foundation, so the wearable device 200 may display augmented virtual content such as image data overlaid on steel beams that connect to the foundation.

The offload rendering and tracking module 406 may be used to offload both the rendering process and the tracking to the visualization server 118. In such a situation, the wearable device 200 uses the least amount of power because tracking data is not determined and virtual content is not rendered locally. Both tracking data and virtual content rendering are performed at the visualization server 118. The wearable device 200 acts as a streaming device to receive the rendered virtual content and to generate a visualization of the rendered virtual content in the display 204.

In one example, the AR offloading application 226 may offload a portion of the rendering process to the visualization server 118 (e.g., the visualization server 118 renders virtual content A, B, and C and the wearable device 200 renders virtual content D, E, and F based on predefined conditions). For example, virtual content that requires more computing resources for rendering may be rendered on the visualization server 118 while virtual objects that require less computing resources for rendering may be rendered on the wearable device 200. In another example, virtual content located in a central area of the display 204 may be rendered on the wearable device 200, while virtual content located in a peripheral area of the display 204 may be rendered on the visualization server 118 and streamed back to the wearable device 200.

In another example, the AR offloading application 226 may adjust a visualization of the virtual content based on updated tracking data from the sensors 202. For example, the wearable device 200 is pointed at a chair. When the wearable device 200 receives the rendered virtual content from the visualization server 118, the chair may have moved. The AR offloading application 226 may then adjust a position of the rendered virtual content in the display 204 based on the last tracked position of the chair.

Figure 5:
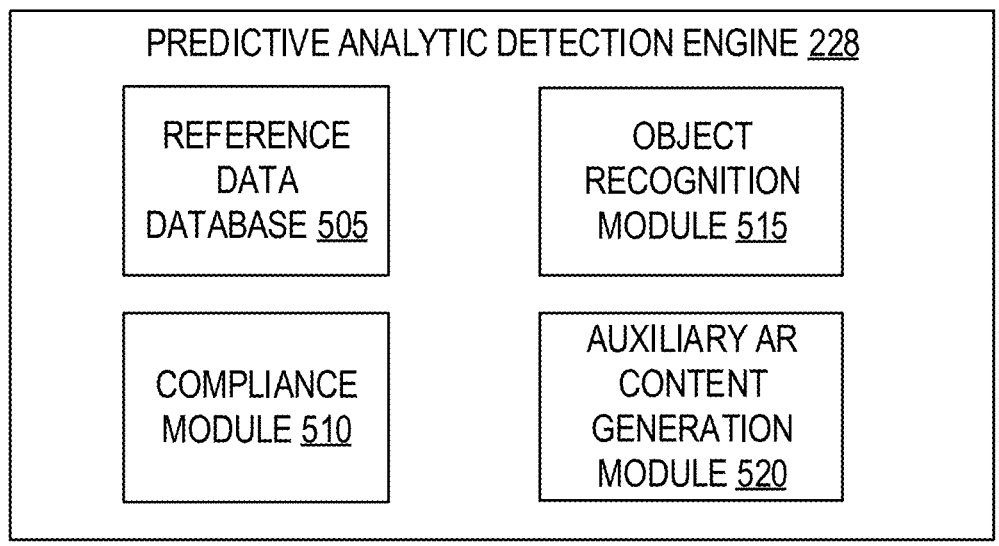
FIG. 5 illustrates a block diagram of an example embodiment of a software module architecture of a predictive analytic detection engine.

FIG. 5 illustrates an exemplary software module architecture of predictive analytic detection engine 228, in accordance with an example embodiment. The predictive analytic detection engine 228 may include a reference data database 505, a compliance module 510, an object recognition module 515, and an auxiliary AR content generation module 520. In many embodiments, reference data database 505 may store user predefined tolerances, thresholds, and/or ranges of environmental information and/or in association with one or more particular objects. For example, and without limitation, a user may predetermine that a particular floor of a building should remain colder than then a particular temperature. In another example, a particular physical object may need to remain within a temperature range above a first temperature and below a second temperature. It should be noted that the data stored in the reference data database is not limited to temperature characteristics. Other sensor data such as, and without limitation, pressure, humidity, sound, vibration, and substantially any other measurable phenomena may also be stored with respect to environments, objects, times, and thresholds/ranges. Sensor data collected from sensors 202 of the wearable device may also be stored in reference data database 505 with respect to a location and time of capturing.

Object recognition module 515 may utilize known techniques such as pattern matching and classification to identify imaged objects captured by sensors 202 of the wearable device. Compliance module 510 may determine anomalies and compliance checks of measured sensor data. The compliance module 510 may update the reference data database by associating newly captured environments, objects, received sensor data, and times together. The compliance module may further perform a database look up to compare an identified imaged object to stored imaged objects within the reference data database to check if newly received sensor data is within acceptable predefined ranges and/or above/below predetermined limits to determine compliance/non-compliance. In some embodiments, the compliance module 510 may track changes in sensor data related to particular environments and/or objects and use well know data spread analysis such as, and without limitation, standard deviations and median based outliers to identify if a current sensor reading related to an environment and/or object is outside of a historically defined trend to determine an anomaly.

Auxiliary AR content generation module 520 may generate auxiliary AR content to augment in display 204 in response to newly received sensor data when an anomaly or non-compliance is detected. The AR content may be overlaid on a particular object or a portion of an environment where the anomaly or non-compliance may have been detected. In some embodiments, the AR content may include for example, and without limitation, a warning, instruction, animation, flashing display, or other visual indicia in response to the anomaly and/or non-compliance detection.

Figure 6:
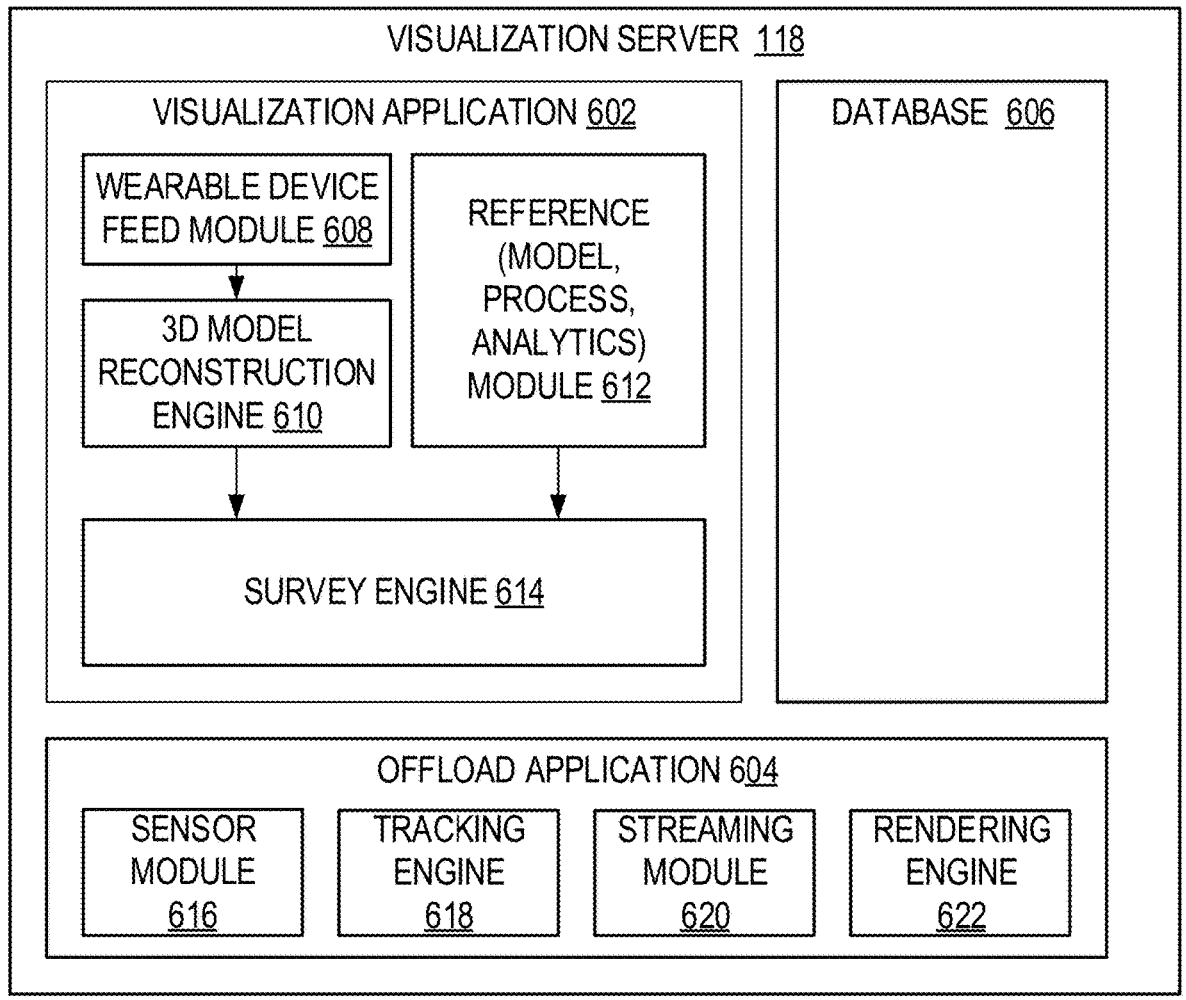
FIG. 6 illustrates a block diagram of an example embodiment of a component architecture of a visualization server.

FIG. 6 illustrates an exemplary component architecture of a visualization server 118, in accordance with an example embodiment. The visualization server 118 includes a visualization application 602, an offload application 604, and a database 606.

The visualization application 602 may be configured to map and survey a physical environment and/or physical object within the environment so as to provide a dynamic or real-time status related to the environment and/or one or more physical objects within the environment. For example, and with reference to FIG. 1, combined data from construction workers each having the wearable device 200 at a shipyard may be used to reconstruct a three-dimensional model of the ship or boat they are building. The three-dimensional model may be rendered at the visualization server 118 and provided to the monitoring client 120 and/or to one or more of the wearable devices. As such, an architect may see a dynamic three-dimensional model of the ship being built. The three-dimensional model may be rendered and provided as augmented information to the wearable devices. Furthermore, the data from the wearable devices may be used for object recognition and object tracking so as to generate a dynamic status of who is working on what part of the ship, where they are, where the tools are, when the tools were last used, and whether the construction worker complied with the specifications or codes.

In one example embodiment, the visualization application 602 may include a wearable device feed module 608, a three-dimensional model reconstruction engine 610, a reference module 612, and a survey engine 614. The viewing device feed module 608 may be configured to communicate with the wearable devices 104, 106, 108, 110, 112, and 114 within an environment to receive sensor feeds from them.

The three-dimensional model reconstruction engine 610 may be configured to reconstruct a three-dimensional model of one or more objects of the environment. In some embodiments, 2D images from different angles and locations around the boat may be used to reconstruct a three-dimensional model of the boat being built using common computer vision systems with three-dimensional object recognition algorithms. In many embodiments, portions of point clouds may be generated from the wearable devices from different angles and locations around the one or more objects, and combined to reconstruct a three-dimensional model of the one or more objects with respect to depth information. Furthermore, the data received from the wearable devices 104, 106, 108, 110, 112, and 114 may be provided to a computer vision object recognition system for identifying and tracking objects in images and video frames.

The reference module 612 may be configured to access reference data from the database 606. The reference data may include a multiplicity of reference three-dimensional models and environmental reconstructions with respect to location, orientation, objects, and time. The reference data may further include predetermined compliance ranges and thresholds.

The survey engine 614 may be configured to compare the reconstructed three-dimensional model, track recognized objects and items, and compare the dynamic data with the reference to determine inventory status, compliance/anomalies, and process. The survey engine 614 is described in more detail with respect to FIG. 7.

The offload application 604 may process offloaded data from the wearable device 200 at the visualization server 118. In one example embodiment, the offload application 604 may include a sensor module 616, a tracking engine 618, a rendering engine 622, and a streaming module 620. The offload application 604 may receive instructions from the wearable device 200 to offload a combination of the tracking process and the rendering process. In response, the offload application 604 generates commands to the corresponding engines 618 and 622 based on the instructions.

The sensor module 616 may interface and communicate with tracking sensors to obtain data related to a geographic position, a location, and an orientation of the wearable device 200.

The tracking engine 618 may generate external tracking data based on the data collected from the sensor module 616 and the tracking sensors. In another embodiment, the tracking engine 618 may generate tracking data based on the data collected from sensors 202 of the wearable device 200.

The rendering engine 622 may generate a three-dimensional rendering of a depth based tessellation, or a 2D rendering of the depth based tessellation fit to an environment and/or environmental objects in the display 204 of the wearable device 200 based on a position of the wearable device 200 relative to the environmental objects. A physical movement of the objects may be identified from an image captured by the wearable device 200. The rendering engine 622 may also determine an AR content corresponding to the tracking data (either received from the wearable device 200 or generated externally to the wearable device 200) and render the AR content. Furthermore, the tracking data may identify a real world object being looked at by the wearable device 200.

The streaming module 620 communicates the rendered AR content back to the wearable device 200 such that the wearable device 200 does not have to render the AR content. In one embodiment, the streaming module 620 may stream a portion of the rendered AR content and let the wearable device 200 render the remaining portions of the AR content that are not rendered or sent by the visualization server 118.

Figure 7:
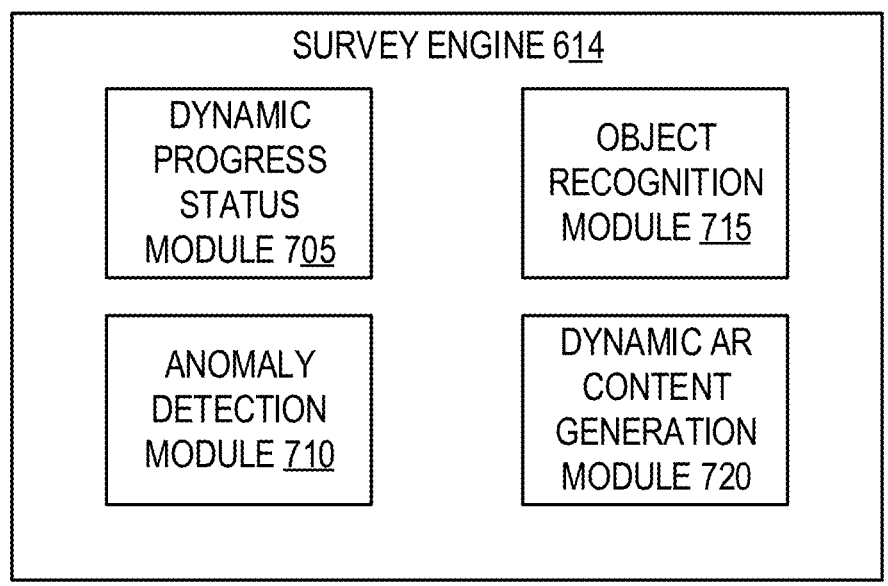
FIG. 7 illustrates a block diagram of an example embodiment of a software module architecture of a survey engine.

FIG. 7 illustrates an exemplary software module architecture of a survey engine 614, in accordance with an example embodiment. The survey engine 614 may include a dynamic progress status module 705, an anomaly detection module 710, an object recognition module 715, and a dynamic AR content generation module 720.

The dynamic progress status module 705 may be configured to retrieve a user selection of a time, position, and orientation associated with environmental rendering based on one or more wearable devices and query reference module 612 to obtain one or more reference three-dimensional models and/or environmental reconstructions stored in database 606. The one or more reference three-dimensional models and/or environmental reconstructions may include progressive changes such as a reconstruction progressing growing through iterative processing before a completed reconstruction with respect to time, position, and orientation changes of the one or more wearable devices used to generate the reconstruction.

Object recognition module 715 may utilize known techniques such as pattern matching and classification to identify imaged objects captured by sensors 202 of the wearable device. Anomaly detection module 710 may determine anomalies and compliance checks of measured sensor data. The anomaly detection module may update database 606 by associating newly captured environments, objects, received sensor data, and times together. The anomaly module may further perform a database look up to compare identified imaged objects to stored imaged objects within database 606 to check if newly received sensor data is within acceptable predefined ranges and/or above/below predetermined limits to determine compliance/non-compliance. In some embodiments, the anomaly detection module may track changes in sensor data related to particular environments and/or objects and use well known data spread analysis such as, and without limitation, standard deviations and median based outliers to identify if a current sensor reading related to an environment and/or object is outside of a historically defined trend to determine an anomaly.

Dynamic AR content generation module 720 may generate auxiliary AR content to augment in display 204 and/or in a display of monitoring client 120. The generation of the auxiliary AR content may be in response to newly received sensor data when an anomaly or non-compliance is detected. The AR content may be overlaid on a particular object or a portion of an environment where the anomaly or non-compliance may have been detected. In some embodiments, the AR content may include, for example, and without limitation, a warning, instruction, animation, flashing display, or other visual indicia in response to the anomaly and/or non-compliance detection. In another embodiment, a user of the monitoring client may request reconstruction display data based on one or more wearable devices over a period time, positions, and orientations. The reconstruction display data may be displayed from an arbitrary viewing perspective at the monitoring client wherein the user, using a GUI, may graphically scrub through changes of the reconstruction display data with respect to time (e.g., historical/future object changes and reconstruction shrinking/growing), orientation and/or position changes, (e.g., as captured by a given wearable device as they move through the environment), and user perspective (e.g., the user manipulating the reconstruction by graphically translating, rotating, and/or tilting)

Figure 8:
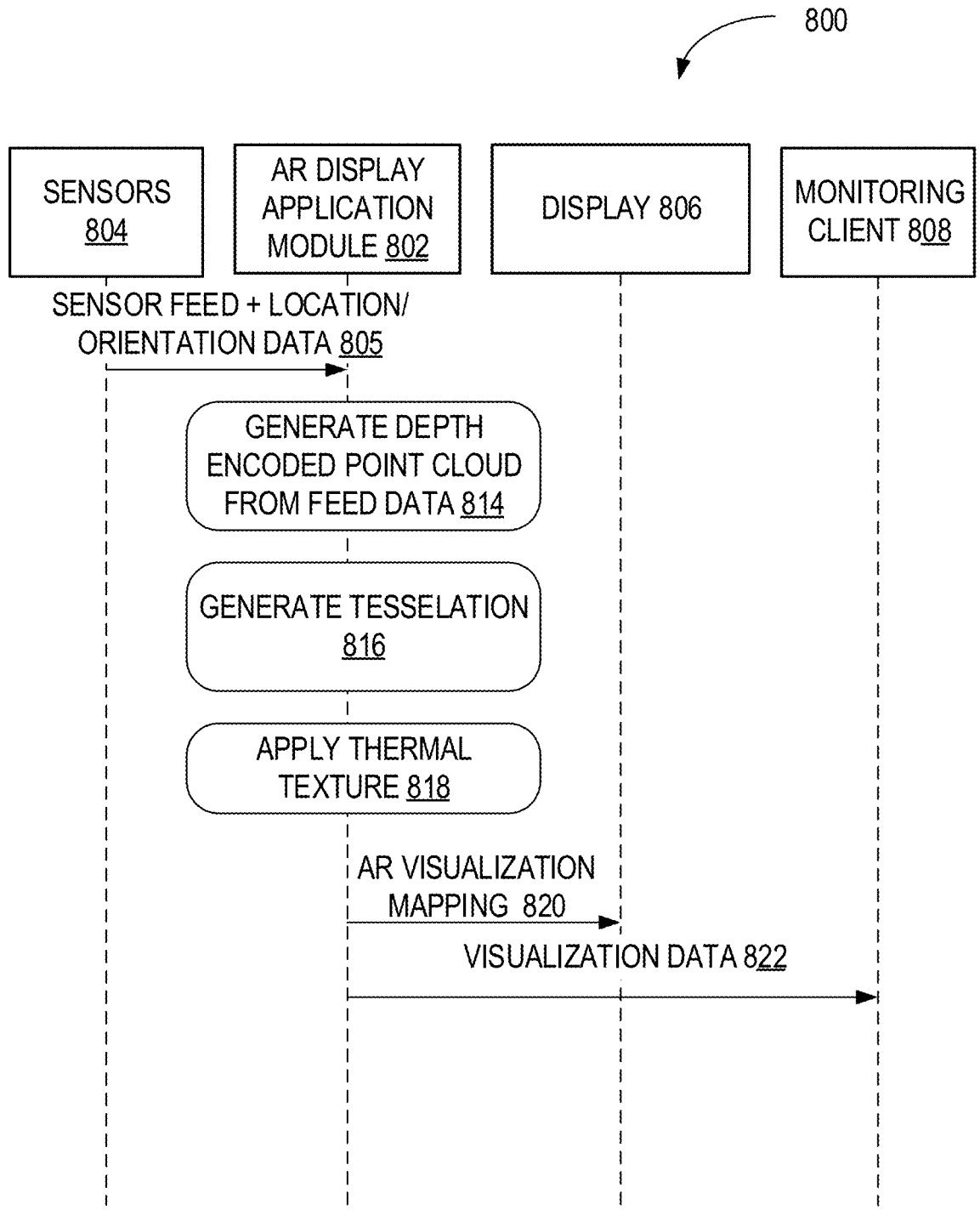
FIG. 8 illustrates a ladder diagram of an example embodiment of mapping visualization data.

FIG. 8 illustrates a ladder diagram 800 of an example embodiment of mapping visualization data. At operation 805, AR display application module 802 receives sensor feed data of an environment being recorded and location/orientation data from sensors 804 of a wearable device viewing the environment. At operation 814, AR display application module 802 may generate point cloud data based on depth encoded sensor data. At operation 816, vertices may be determined in the point cloud data and used to generate a tessellation. At operation 818, thermal data recorded by the sensors may be applied to the tessellation during rendering. In other embodiments, substantially any other measurable sensor data may be applied to the tessellation during rendering. At operation 820, an AR visualization of the depth based tessellation with applied thermal texture may be mapped to display 806 to overlay the environment and/or objects with the environment corresponding to the received sensor feed data. Thermal texture may refer to an image that depicts relative thermal information, and using that image has a texture for a 3D surface.

Optionally, at operation 822 a three-dimensional model of the AR visualization may be displayed and/or stored on monitoring client 808. In many embodiments, a user at a monitoring client may observer a three-dimensional model of the AR visualization that is displayed on display 806 in real-time.

In some exemplary embodiments, the AR content generator module may generate AR content by further using user toggle preferences, wherein the user toggle preferences may include, for example, and without limitation, applying texture data to only geometrical spaces (e.g., faces) of a generated tessellation or applying texture data to only edges and vertices of a generated tessellation. In another exemplary embodiment, no tessellation may be rendered and an AR content may include depth based texture data such as, and without limitation, RGB color data, grayscale color data, thermal data, substantially any other receivable sensor data, or any combination thereof. In the present embodiment, the texture data may be applied to a generated tessellation; however, the tessellation itself may not be visualized.

Figure 9:
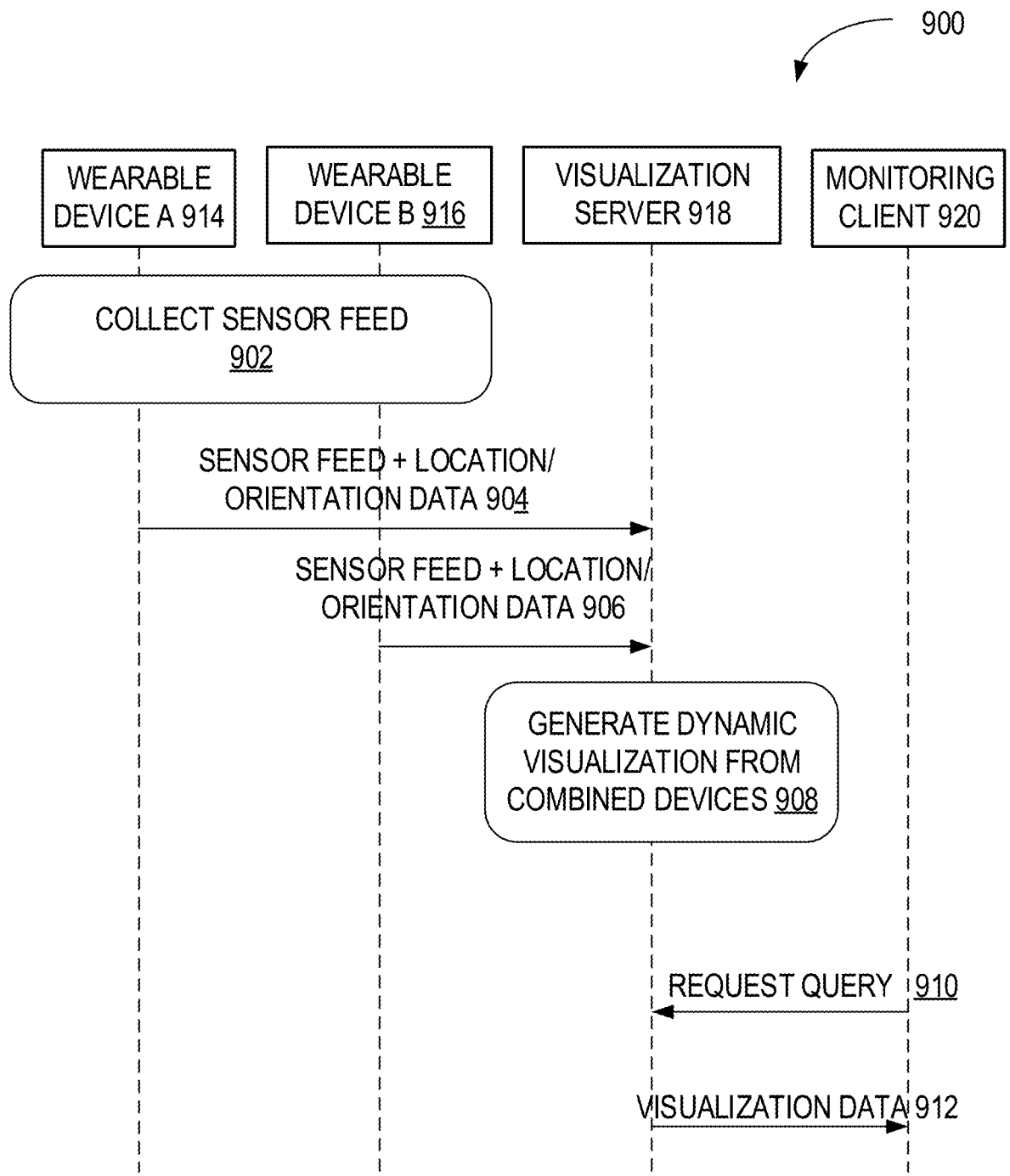
FIG. 9 illustrates a ladder diagram of an example embodiment of reconstruction scrubbing operation.

FIG. 9 illustrates a ladder diagram 900 of an example embodiment of reconstruction scrubbing. At operation 902, wearable device A 914 and wearable device B 916 may simultaneously view and capture sensor feed data associated with position and orientation data over a length of time from a same environment comprising one or more physical objects. At operation 904, wearable device A 914 may offload the feed data and position/orientation data to visualization server 918 and continue to offload while continuing to capture data. At operation 906, wearable device B 916 may offload the feed data and position/orientation data to the visualization server 918 and continue to offload while continuing to record. At operation 908 the visualization server 918 may continuously or periodically (e.g., 5 second, 20 second, 30 second intervals) generate, render, and store AR visualization/three-dimensional reconstruction model content with respect to time. At operation 910, the monitoring client 920 queries a display of the visualization by providing a wearable device identification, viewed location identification, and/or a database identification where the visualization may be stored. At operation 912, the visualization server 918 may offload the visualization data of the three-dimensional model of the environment with respect to time. The three-dimensional model may be displayed from an arbitrary view (e.g., bird's eye, left perspective, angled perspective). The user may further view historical images of the reconstruction with respect to time. Furthermore, future reconstruction images, with respect to a current viewing time, are viewable while the wearable devices capture environmental data in real-time.

In some exemplary embodiments, a predetermined portion of a wearable device display may be designated as a region of interest, wherein environmental regions viewed within the region of interest can include augmented texture data visualized at a first opacity. Furthermore, a multiplicity of portions of the wearable device display outside of the designated region of interest can include augmented texture data visualized at a multiplicity of opacities respectively, wherein the multiplicity of opacities may be greater than the first opacity. In some embodiments, the texture visualization at the multiplicity of opacities may be based on a spatial characteristic, temporal characteristic, or a combination thereof.

Figure 10:
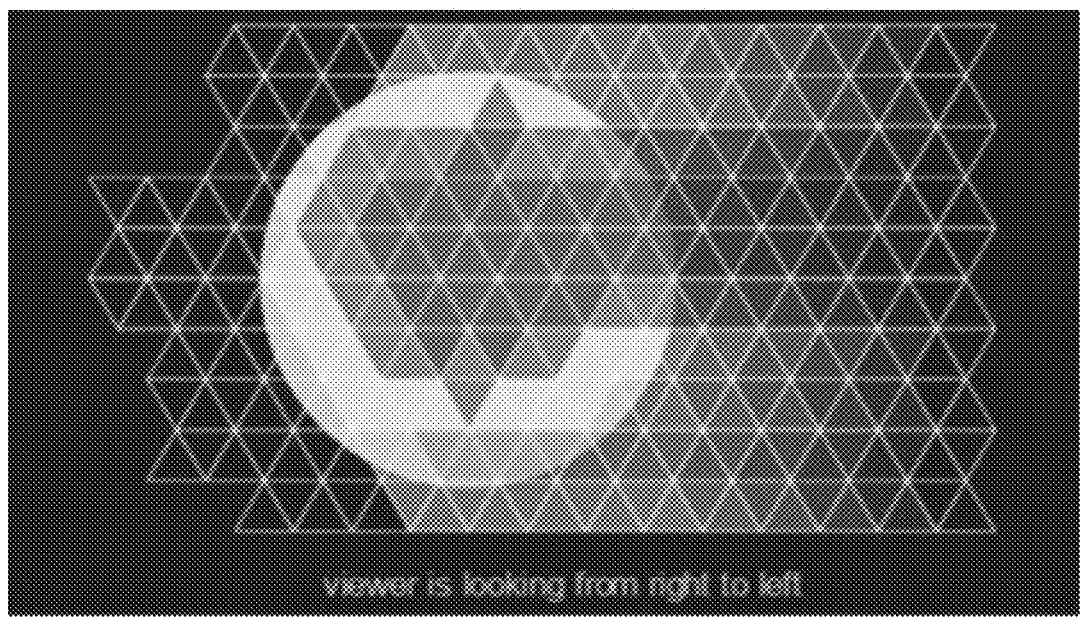
FIG. 10 illustrates a screenshot of an example of mapping visualization.

FIG. 10 illustrates a screen shot of an exemplary mapping visualization, in accordance with an example embodiment. In the present embodiment, a centralized portion of a wearable device display may be designated as a region of interest. Mapped AR content displayed within the region of interest may be displayed clearly with 100% opacity. As mapped content is no longer displayed within the region of interest due to a user changing position and/or orientation, texture data visualization outside of the region of interest begins to decrease in opacity until the texture data can no longer be seen. In some embodiments, the opacity of mapped areas outside of the region of interest may increase at a rate inversely proportional to a color temperature of the texture data. In some embodiments, the opacity of mapped areas outside of the region of interest may increase proportionally to a time since last in the ROI. In some embodiments, the opacity of mapped areas outside of the region of interest may increase proportionally to a lateral and/or depth distance from the region of interest.

FIG. 11 illustrates screen shots of a mapping visualization, in accordance with an example embodiment. Screenshot 1102 illustrates a thermal texture. Screenshot 1104 illustrates a user depth texture. Screenshot 1106 illustrates a visible light texture.

Figure 12:
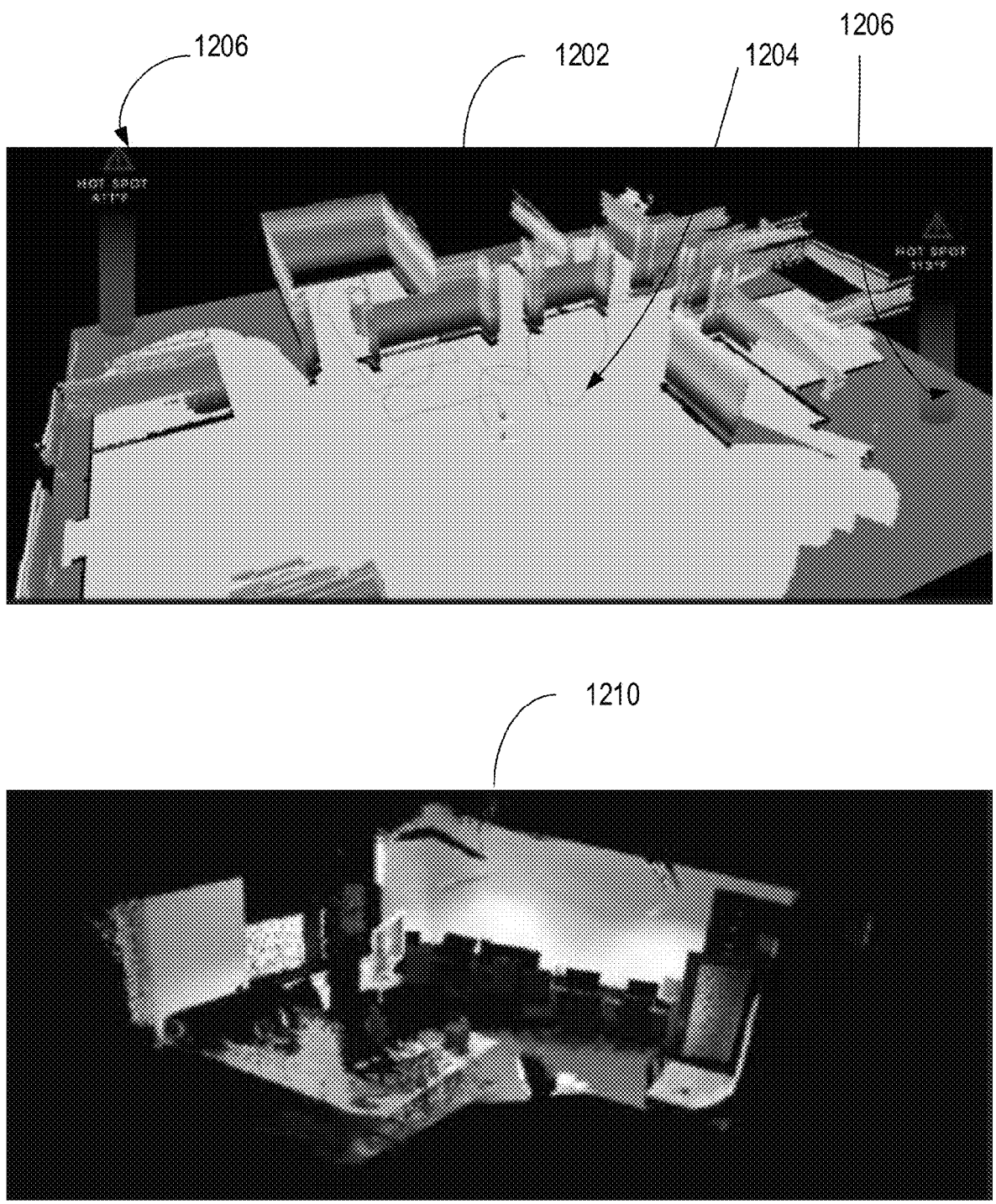
FIG. 12 illustrates screenshots of an example of a dynamic mapping visualization.

FIG. 12 illustrates screen shots of a dynamic mapping visualization, in accordance with an example embodiment. Screenshot 1202 illustrates a third perspective three-dimensional view of thermal texture reconstructed based on the thermal sensor data generated at a wearable device. A travel path 1204 of the wearable device is illustrated. The travel path 1204 is based on the VIN module of the wearable device. Hot spots 1206 are illustrated based on the thermal data to identify dangerous areas to the wearer of the wearable device. Screenshot 1210 illustrates a third perspective three-dimensional view of thermal texture reconstructed based on the depth sensor data generated at a wearable device.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 116 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
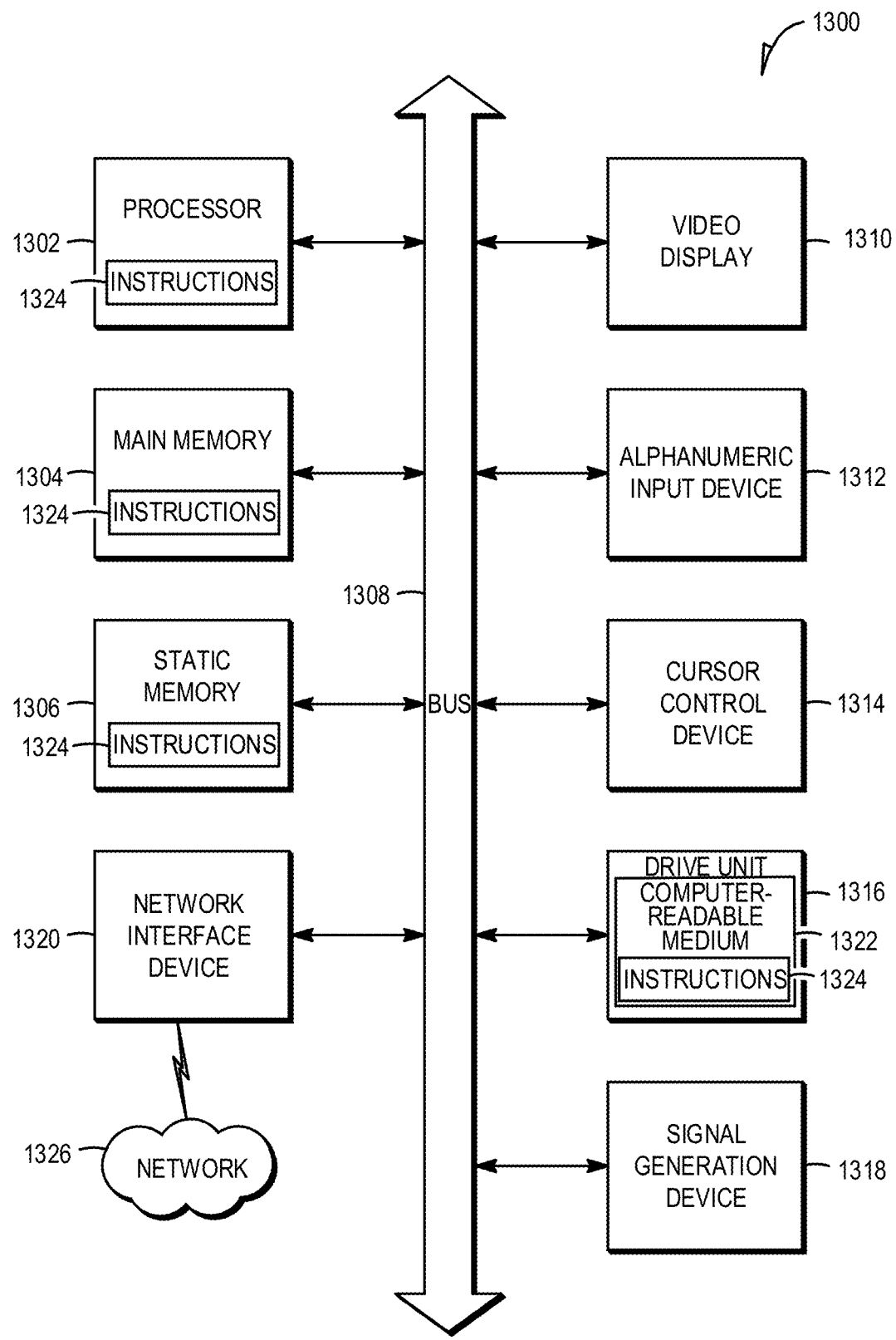
FIG. 13 is a block diagram illustrating components of a machine, according to some example embodiments, able to read instructions from a machine-readable medium and perform any one or more of the methodologies discussed herein.

FIG. 13 is a block diagram of a machine in the example form of a computer system 1300 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a visualization server 118 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU), or both), a main memory 1304, and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a disk drive unit 1316, a signal generation device 1318 (e.g., a speaker), and a network interface device 1320.

Machine-Readable Medium

The disk drive unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, with the main memory 1304 and the processor 1302 also constituting machine-readable media. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions 1324 for execution by the machine and that cause the machine to perform any one or more of the methodologies of the present embodiments, or that is capable of storing, encoding or carrying data structures utilized by or associated with such instructions 1324. The term "machine-readable medium" shall accordingly be taken to include, but not be limited to, solid-state memories, and optical and magnetic media. Specific examples of machine-readable media 1322 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, POTS networks, and wireless data networks (e.g., Wi-Fi and WiMax networks). The term "transmission medium" shall be taken to include any intangible medium capable of storing, encoding, or carrying instructions 1324 for execution by the machine, and includes digital or analog communications signals or other intangible media to facilitate communication of such software.

Example Mobile Device

Figure 14:
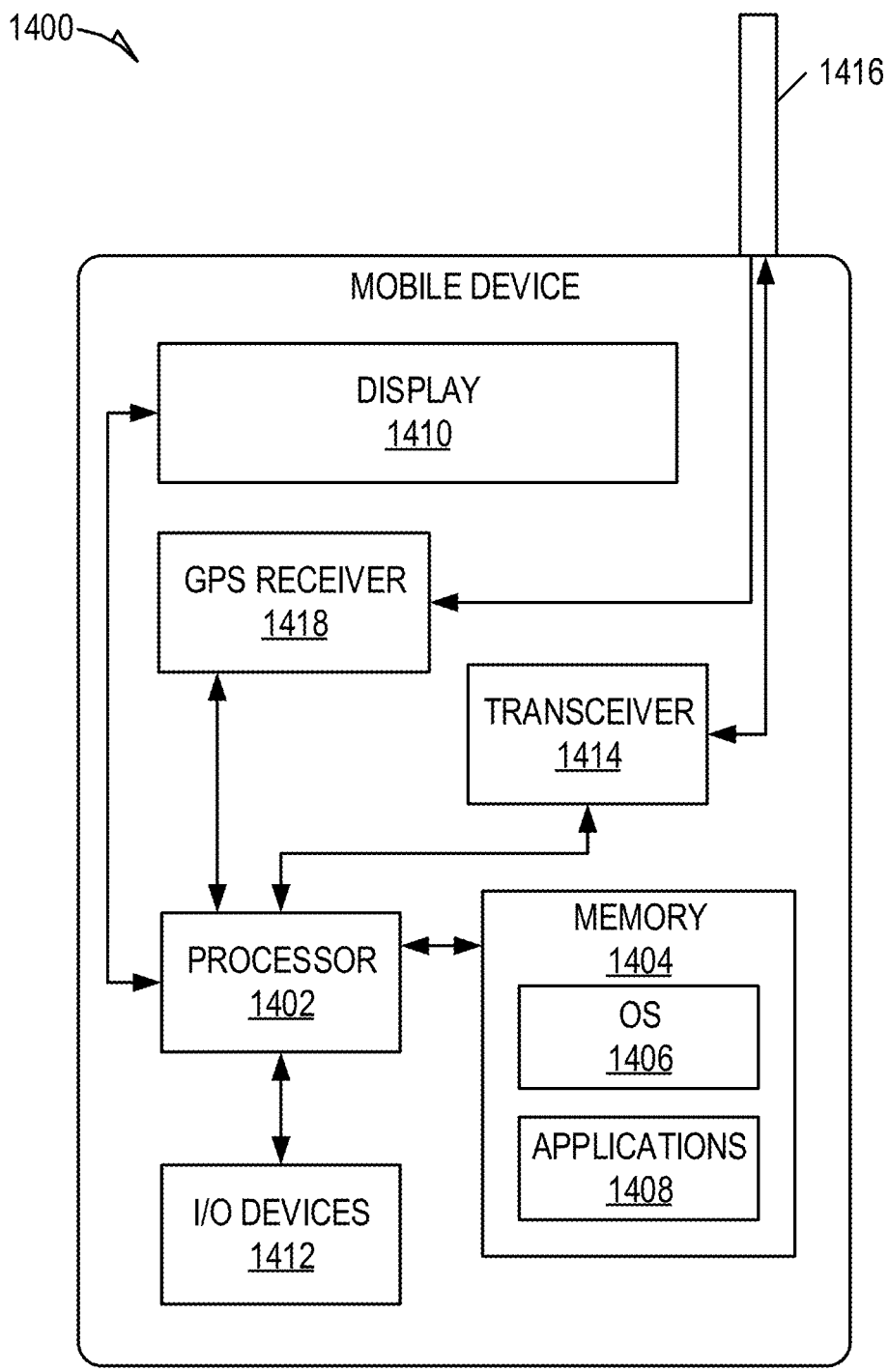
FIG. 14 is a block diagram illustrating an example embodiment of a mobile device.

FIG. 14 is a block diagram illustrating a mobile device 1400, according to an example embodiment. The mobile device 1400 may include a processor 1402. The processor 1402 may be any of a variety of different types of commercially available processors 1402 suitable for mobile devices 1400 (for example, an XScale architecture microprocessor, a microprocessor without interlocked pipeline stages (MIPS) architecture processor, or another type of processor 1402). A memory 1404, such as a random access memory (RAM), a flash memory, or other type of memory, is typically accessible to the processor 1402. The memory 1404 may be adapted to store an operating system (OS) 1406, as well as application programs 1408, such as a mobile location enabled application that may provide LBSs to a user 102. The processor 1402 may be coupled, either directly or via appropriate intermediary hardware, to a display 1410 and to one or more I/O devices 1412, such as a keypad, a touch panel sensor, a microphone, and the like. Similarly, in some embodiments, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separate embodiment.

What is claimed is:

1. A wearable device comprising:
    a depth sensor configured to generate depth data based on a depth of a plurality of physical objects in a physical environment;
    a camera configured to generate images of the plurality of physical objects, the camera comprising an infrared camera configured to generate thermal data corresponding to a depth-based three-dimensional point cloud;
    an inertial measuring unit (IMU) sensor configured to generate spatial location and orientation data of the wearable device;
    a display configured to display virtual content corresponding to the physical environment;
    a hardware processor configured to perform operations comprising:
        determining a spatial state of the wearable device based on the spatial location and orientation data of the wearable device;
        generating the depth-based three-dimensional point cloud corresponding to the depth data;
        generating a tessellation surface by tessellating the depth-based three-dimensional point cloud;
        generating virtual content corresponding to the tessellation surface based on the spatial state; and
        mapping the virtual content in the display based on the spatial state of the wearable device,
    wherein generating the virtual content further comprises:
        retrieving, from a database, a threshold temperature corresponding to one or more physical object from the plurality of objects, the database storing predefined threshold temperatures and ranges for the plurality of objects;
        forming a thermal texture based on the thermal data and the threshold temperature; and
        correlating the thermal texture to the images of the plurality of physical objects based on the depth-based three-dimensional point cloud.

2. The wearable device of claim 1, wherein the operations further comprise:
    measuring a temperature of a first physical object from the plurality of physical objects based on the thermal data;
    determining that the temperature of the first physical object exceeds the threshold temperature for the first physical object; and
    modifying the virtual content with an identification that the first physical object exceeds the threshold temperature.

3. The wearable device of claim 1, wherein the operations further comprise:
    identifying a first physical object from the plurality of physical objects;
    identifying the threshold temperature corresponding to the first physical object;
    measuring a temperature of the first physical object based on the thermal data;
    determining that the temperature of the first physical object exceeds the threshold temperature; and
    modifying the virtual content with an identification that the first physical object exceeds the threshold temperature.

4. The wearable device of claim 1, wherein the operations further comprise:

providing the spatial state of the wearable device and the depth-based three-dimensional point cloud to a server;

receiving, from the server, the tessellation of the depth-based three-dimensional point cloud; and receiving, from the server, the virtual content corresponding to the tessellation surface and the spatial state.

5. The wearable device of claim 4, wherein the operations further comprise:

receiving an identification of an anomaly from the server, the anomaly being selected by the server based on the tessellation of the depth-based three-dimensional point cloud; and modifying the virtual content with an identification of the anomaly corresponding to one of the plurality of physical objects.

6. The wearable device of claim 5, wherein the operations further comprise:

retrieving a reference point cloud model of the depth-based three-dimensional point cloud corresponding to the environment;

comparing the depth-based three-dimensional point cloud with the reference point cloud model;

identifying an anomaly based on the comparison; and modifying the virtual content with the identification of the anomaly corresponding to one of the plurality of physical objects.

7. The wearable device of claim 1, wherein the operations further comprise:

receiving information from a second wearable device located in the environment, the information identifying a spatial state of the second wearable device based on spatial location and orientation data of the second wearable device, and second depth data based on a depth of the plurality of physical objects relative to the second wearable device, generating a second depth-based three-dimensional point cloud corresponding to the second depth data;

generating a combined tessellation of the depth-based three-dimensional point cloud and the second depth-based three-dimensional point cloud;

generating second virtual content corresponding to the combined tessellation and the spatial state of the wearable device; and mapping the second virtual content in the display based on the spatial state of the wearable device.

8. The wearable device of claim 1, wherein generating the virtual content further comprises:

forming a depth texture based on the depth-based three-dimensional point cloud; and correlating the depth texture to images of the physical objects based on the depth-based three-dimensional point cloud.

9. The wearable device of claim 1, wherein the operations further comprise:

receiving a rendering preference from a user of the wearable device, the rendering preference identifying one of a thermal texture, a depth texture, and a visible light texture.

10. A computer-implemented method comprising:

generating, with a depth sensor of a wearable device, depth data based on a depth of a plurality of physical objects in a physical environment;

generating, with a camera of the wearable device, images of the plurality of physical objects;

generating, with a thermal camera of the wearable device, thermal data corresponding to a depth-based three-dimensional point cloud;

generating spatial location and orientation data of the wearable device with an inertial measuring unit (IMU) sensor at the wearable device;

determining a spatial state of the wearable device based on the spatial location and orientation data of the wearable device;

generating the depth-based three-dimensional point cloud corresponding to the depth data;

generating a tessellation surface by tessellating the depth-based three-dimensional point cloud;

generating virtual content corresponding to the tessellation surface based on the spatial state; and mapping the virtual content in a display of the wearable device based on the spatial state of the wearable device, wherein generating the virtual content further comprises:

retrieving, from a database, a threshold temperature corresponding to one or more physical object from the plurality of objects, the database storing predefined threshold temperatures and ranges for the plurality of objects;

forming a thermal texture based on the thermal data and the threshold temperature; and correlating the thermal texture to the images of the plurality of physical objects based on the depth-based three-dimensional point cloud.

11. The computer-implemented method of claim 10, further comprising:

measuring a temperature of a first physical object from the plurality of physical objects based on the thermal data;

determining that the temperature of the first physical object exceeds the threshold temperature for the first physical object; and modifying the virtual content with an identification that the first physical object exceeds the threshold temperature.

12. The computer-implemented method of claim 10, further comprising:

identifying a first physical object from the plurality of physical objects;

identifying the threshold temperature corresponding to the first physical object;

measuring a temperature of the first physical object based on the thermal data;

determining that the temperature of the first physical object exceeds the threshold temperature; and modifying the virtual content with an identification that the first physical object exceeds the threshold temperature.

13. The computer-implemented method of claim 10, further comprising:

providing the spatial state of the wearable device and the depth-based three-dimensional point cloud to a server;

receiving, from the server, the tessellation of the depth-based three-dimensional point cloud; and receiving, from the server, the virtual content corresponding to the tessellation and the spatial state.

14. The computer-implemented method of claim 13, further comprising:

receiving an identification of an anomaly from the server, the anomaly identified based on the tessellation of the depth-based three-dimensional point cloud; and modifying the virtual content with an identification of the anomaly corresponding to one of the plurality of physical objects.

15. The computer-implemented method of claim 14, further comprising:

retrieving a reference point cloud model of the depth-based three-dimensional point cloud corresponding to the environment;

comparing the depth-based three-dimensional point cloud with the reference point cloud model;

identifying an anomaly based on the comparison; and modifying the virtual content with the identification of the anomaly corresponding to one of the plurality of physical objects.

16. The computer-implemented method of claim 10, further comprising:

receiving information from a second wearable device located in the environment, the information identifying the spatial state of the second wearable device based on spatial location and orientation data of the second wearable device, and second depth data based on a depth of the plurality of physical objects relative to the second wearable device, generating a second depth-based three-dimensional point cloud corresponding to the second depth data;

generating a combined tessellation of the depth-based three-dimensional point cloud and the second depth-based three-dimensional point cloud;

generating second virtual content corresponding to the combined tessellation and the spatial state of the wearable device; and mapping the second virtual content in the display based on the spatial state of the wearable device.

17. The computer-implemented method of claim 10, wherein generating the virtual content further comprises:

forming a depth texture based on the depth-based three-dimensional point cloud; and correlating the depth texture to images of the physical objects based on the depth-based three-dimensional point cloud.

18. A non-transitory machine-readable medium comprising instructions that, when executed by one or more processors of a machine, cause the machine to perform operations comprising:

generating, with a depth sensor of a wearable device, depth data based on a depth of a plurality of physical objects in a physical environment;

generating, with a camera of the wearable device, images of the plurality of physical objects;

generating, with a thermal camera of the wearable device, thermal data corresponding to a depth-based three-dimensional point cloud;

generating spatial location and orientation data of the wearable device with an inertial measuring unit (IMU) sensor at the wearable device;

determining a spatial state of the wearable device based on the spatial location and orientation data of the wearable device;

generating the depth-based three-dimensional point cloud corresponding to the depth data;

generating a tessellation surface by tessellating the depth-based three-dimensional point cloud;

generating virtual content corresponding to the tessellation surface based on the spatial state; and mapping the virtual content in a display of the wearable device based on the spatial state of the wearable device, wherein generating the virtual content further comprises:

retrieving, from a database, a threshold temperature corresponding to one or more physical object from the plurality of objects, the database storing predefined threshold temperatures and ranges for the plurality of objects;

forming a thermal texture based on the thermal data and the threshold temperature; and correlating the thermal texture to the images of the plurality of physical objects based on the depth-based three-dimensional point cloud.

* * * * *